(12) United States Patent  
Burtt et al.

(10) Patent No.: US 8,739,478 B1
(45) Date of Patent: Jun. 3, 2014

(54) INTEGRATED THERMAL MODULE AND BACK PLATE STRUCTURE AND RELATED METHODS

(75) Inventors: Eric R. Burtt, Orinda, CA (US); Samuel Truthseeker, El Sobrante, CA (US)

(73) Assignee: PVT Solar, Inc., Fremont, CA (US)

( * ) Notice: Subject to any disclaimer, the term of this patent is extended or adjusted under 35 U.S.C. 154(b) by 0 days.

(21) Appl. No.: 13/250,908

(22) Filed: Sep. 30, 2011

Related U.S. Application Data

(63) Continuation-in-part of application No. 12/851,310, filed on Aug. 5, 2010, which is a continuation of application No. 12/638,964, filed on Dec. 15, 2009, now abandoned.

(60) Provisional application No. 61/141,623, filed on Dec. 30, 2008.

(51) Int. Cl.  
*E04D 13/18* (2006.01)

(52) U.S. Cl.  
USPC ............... 52/173.3; 52/302.3; 126/621

(58) Field of Classification Search  
USPC ............... 52/173.3, 302.1, 302.3, 475.1, 764, 52/772; 126/621–629, 634, 637  
See application file for complete search history.

(56) References Cited

U.S. PATENT DOCUMENTS

| 842,658 A | 1/1907 | Haskell |
| 2,944,371 A | 7/1960 | Muhr |
| 3,841,302 A | 10/1974 | Falbel |
| 3,957,109 A | 5/1976 | Worthington |
| 4,062,351 A * | 12/1977 | Hastwell ............ 126/571 |
| 4,068,652 A | 1/1978 | Worthington |
| 4,082,080 A | 4/1978 | Pittinger |
| 4,103,493 A | 8/1978 | Schoenfelder |

(Continued)

FOREIGN PATENT DOCUMENTS

| DE | 3611542 A1 | 10/1987 | |
| JP | 63006343 A * | 1/1988 | ............ F24J 2/04 |
| JP | 11062146 A | 3/1999 | |
| KR | 2009103465 A | 10/2009 | |

OTHER PUBLICATIONS

Office Action and List of References for U.S. Appl. No. 12/851,310 mailed Mar. 30, 2012 from the United States Patent and Trademark Office.  
English machine translation of DE 3611542 A1, 2012.

(Continued)

*Primary Examiner* — Brian Glessner  
*Assistant Examiner* — Adam Barlow  
(74) *Attorney, Agent, or Firm* — Armstrong Teasdale LLP

(57) ABSTRACT

An integrated solar module capable of being easily assembled for thermal solar application. The module includes a solar panel device having an aperture region and a backside region and a shaped thickness of material including a first side wall and a second side wall. The shaped thickness of material is characterized by a fire rating of at least A and has a mechanical strength to maintain a thickness free from penetration of moisture and a specific shape to couple with the backside region. Additionally, the module includes an air plenum provided between the backside region and the shaped thickness of material. The air plenum is configured to receive air flows from ambient via an intake region and guide the air flows toward an output region. The air flows are optionally let to pass through either or both of the first side wall and the second side wall.

9 Claims, 24 Drawing Sheets

(56) References Cited

U.S. PATENT DOCUMENTS

| | | | |
|---|---|---|---|
| 4,128,124 A | 12/1978 | Worthington | |
| 4,141,339 A | 2/1979 | Weinstein | |
| 4,172,442 A | 10/1979 | Boblitz | |
| 4,228,729 A | 10/1980 | Messick | |
| 4,242,872 A | 1/1981 | Shaw | |
| 4,275,709 A | 6/1981 | Barcelo Rubi | |
| 4,393,859 A | 7/1983 | Marossy et al. | |
| 4,426,999 A | 1/1984 | Evans et al. | |
| 4,437,511 A | 3/1984 | Sheridan | |
| 4,552,205 A | 11/1985 | Saunders | |
| 4,765,308 A | 8/1988 | Marran | |
| 4,967,729 A | 11/1990 | Okumura | |
| 5,452,710 A | 9/1995 | Palmer | |
| 5,768,831 A | 6/1998 | Melchior | |
| 5,851,309 A | 12/1998 | Kousa | |
| 5,908,674 A | 6/1999 | Schindler et al. | |
| 6,061,978 A | 5/2000 | Dinwoodie et al. | |
| 6,063,996 A | 5/2000 | Takada et al. | |
| 6,093,884 A | 7/2000 | Toyomura et al. | |
| 6,182,403 B1 | 2/2001 | Mimura et al. | |
| 6,182,404 B1 | 2/2001 | Rinlake et al. | |
| 6,472,593 B1 | 10/2002 | Middelman et al. | |
| 6,792,938 B2 | 9/2004 | Komano et al. | |
| 6,800,801 B2 | 10/2004 | Sasaoka et al. | |
| 7,297,866 B2 | 11/2007 | Aschenbrenner | |
| 7,475,828 B2 | 1/2009 | Bartlett et al. | |
| 7,484,507 B2 | 2/2009 | Nikiforov et al. | |
| 7,562,498 B2 | 7/2009 | Galeazzo et al. | |
| 7,592,537 B1 | 9/2009 | West | |
| 7,774,998 B2 * | 8/2010 | Aschenbrenner | 52/173.3 |
| 7,896,000 B2 | 3/2011 | Nikiforov et al. | |
| 2002/0117166 A1 | 8/2002 | Okumura | |
| 2003/0061773 A1 | 4/2003 | O'Leary | |
| 2003/0154666 A1 * | 8/2003 | Dinwoodie | 52/173.3 |
| 2003/0172606 A1 | 9/2003 | Anderson | |
| 2004/0154615 A1 | 8/2004 | Komano et al. | |
| 2004/0182432 A1 | 9/2004 | Yoda et al. | |
| 2005/0040250 A1 | 2/2005 | Wruck | |
| 2005/0061311 A1 | 3/2005 | Christensen | |
| 2005/0121068 A1 | 6/2005 | Sager et al. | |
| 2005/0199278 A1 | 9/2005 | Aschenbrenner | |
| 2006/0005491 A1 | 1/2006 | Cooper et al. | |
| 2006/0117769 A1 | 6/2006 | Helt et al. | |
| 2006/0118163 A1 | 6/2006 | Plaisted et al. | |
| 2007/0155305 A1 | 7/2007 | Heidel et al. | |
| 2008/0010915 A1 | 1/2008 | Liebendorfer | |
| 2008/0087320 A1 | 4/2008 | Mapes et al. | |
| 2008/0096482 A1 | 4/2008 | Wettergren | |
| 2008/0172955 A1 * | 7/2008 | McClintock et al. | 52/173.3 |
| 2008/0289679 A1 | 11/2008 | Ressler | |
| 2008/0302030 A1 * | 12/2008 | Stancel et al. | 52/173.3 |
| 2008/0305030 A1 | 12/2008 | McKeigue et al. | |
| 2009/0001179 A1 | 1/2009 | Dempsey | |
| 2009/0038668 A1 | 2/2009 | Plaisted | |
| 2009/0065046 A1 | 3/2009 | DeNault | |
| 2009/0081413 A1 | 3/2009 | Wilde et al. | |
| 2009/0090412 A1 | 4/2009 | Calwer et al. | |
| 2009/0113822 A1 | 5/2009 | Patrina et al. | |
| 2009/0114369 A1 | 5/2009 | Kammerzell | |
| 2010/0132275 A1 | 6/2010 | Stanger | |
| 2010/0140070 A1 | 6/2010 | Simard et al. | |
| 2010/0287867 A1 | 11/2010 | Constantino | |
| 2011/0151766 A1 | 6/2011 | Sherman et al. | |
| 2011/0276183 A1 | 11/2011 | Liu | |

OTHER PUBLICATIONS

English machine translation of JP H11-062146 A, retrieved 2013.
International Search Report and Written Opinion of PCT Application No. PCT/US2010/038123, dated Aug. 19, 2010, 10 pages total.
Office Action and List of References for U.S. Appl. No. 13/269,251 dated Aug. 2, 2012.

* cited by examiner

INTEGRATED THERMAL MODULE AND BACK PLATE STRUCTURE AND RELATED METHODS

CROSS-REFERENCE TO RELATED APPLICATIONS

This application is a continuation in part application of U.S. application Ser. No. 12/851,310, filed Aug. 5, 2010, which is a continuation application of and claims priority from U.S. application Ser. No. 12/638,964, filed Dec. 15, 2009, which further claims priority from U.S. Provisional Application No. 61/141,623, filed Dec. 30, 2008, commonly assigned, and incorporated by reference for all purposes herein.

BACKGROUND OF THE INVENTION

The present invention relates to operation of a thermal solar system. More particularly, the present invention provides a method and system for using a back plate structure to form a plenum for a thermal solar system. Merely, by way of example, the present invention has been applied to a thermal solar module configured on a building structure, but it would be recognized that the invention has a much broader range of applications.

Over the past centuries, the world population of human beings has exploded. Along with the population, demand for resources has also grown explosively. Such resources include raw materials such as wood, iron, and copper and energy, such as fossil fuels, including coal and oil. Industrial countries world wide project more increases in oil consumption for transportation and heating purposes from developing nations such as China and India. Obviously, our daily lives depend, for the most part, upon oil or other forms of fossil fuel, which is becoming scarce as it becomes depleted.

Along with the depletion of our fossil fuel resources, our planet has experienced a global warming phenomena, known as "global warming," which was brought to our foremost attention by our Al Gore, who is the former Vice President of the United States of America. Global warming is known as an increase in an average temperature of the Earth's air near its surface, which is projected to continue to increase at a rapid pace. Warming is believed to be caused by greenhouse cases, which are derived, in part, from use of fossil fuels. The increase in temperature is expected to cause a rise in temperature, extreme weather conditions, and higher sea levels. Ultimately, other effects include mass species extinctions, and possibly other uncertainties that may be detrimental to human beings.

Much if not all of the useful energy found on the Earth comes from our sun. Generally all common plant life on the Earth achieves life using photosynthesis processes from sun light. Fossil fuels such as oil were also developed from biological materials derived from energy associated with the sun. For most living beings on the Earth, sunlight has been essential. Likewise, the sun has been our most important energy source and fuel for modern day solar energy. Solar energy possesses many characteristics that are very desirable! Solar energy is renewable, clean, abundant, and often widespread.

As an example, solar panels have been developed to convert sunlight into energy. As merely an example, solar thermal panels often convert electromagnetic radiation from the sun into thermal energy for heating homes, running certain industrial processes, or driving high grade turbines to generate electricity. As another example, solar photovoltaic panels convert sunlight directly into electricity for a variety of applications. Solar panels are generally composed of an array of solar cells, which are interconnected to each other. The cells are often arranged in series and/or parallel groups of cells in series. Accordingly, solar panels have great potential to benefit our nation, security, and human users. They can even diversify our energy requirements and reduce the world's dependence on oil and other potentially detrimental sources of energy.

Although solar panels have been used successful for certain applications, there are still certain limitations. Solar cells are often costly. Depending upon the geographic region, there are often financial subsidies from governmental entities for purchasing solar panels, which often cannot compete with the direct purchase of electricity from public power companies. Additionally, the panels are often composed of silicon bearing wafer materials. Such wafer materials are often costly and difficult to manufacture efficiently on a large scale. Availability of solar panels is also somewhat scarce. That is, solar panels are often difficult to find and purchase from limited sources of photovoltaic silicon bearing materials. These and other limitations are described throughout the present specification, and may be described in more detail below.

From the above, it is seen that techniques for improving operation of a solar system are highly desired.

BRIEF SUMMARY OF THE INVENTION

According to the present invention, techniques related to operation of a thermal solar system are provided. More particularly, the present invention provides a method and system for using a back plate structure to form a plenum for a thermal solar system. Merely, by way of example, the present invention has been applied to a thermal solar module configured on a building structure, but it would be recognized that the invention has a much broader range of applications.

As further information for background reading, solar components are often secured into a basic frame structure to form a solar module. The solar module is commonly made of a laminated structure including cover glass, photovoltaic window and absorber material, and electrodes, which are spatially disposed in a frame structure. As an example, a plurality of modules are spatially positioned and secured in a mounting frame in an array configuration arranged in rows and columns. The array is often secured to a building structure or other spatial location. The solar array often includes an aperture region and an underside opening, which is spatially open, elevated, and free from impediments or confinements to allow air, heat, and water to pass and flow under or around the components, modules or array elements. Further details of the solar module can be found throughout the present specification and more particularly below.

According to a specific embodiment, solar components can include one or more of the following:
1. Photovoltaic sheet(s) to create electricity energy from the sun;
2. Conductive thermal sheet(s) to collect thermal energy from the sun;
3. Cover glass and frame for securing the photovoltaic and conductive thermal sheet;
4. Other components.

Of course, there can be other variations, modifications, and alternatives. As an example, modules serve one or more functions, including a solar function, a function maxillary to the solar functions, or a completely non-solar function for any type of purpose including but not necessarily limited to:
1. Solar electricity generating (photovoltaic) modules, panel, unit or assembly;

2. Solar thermal water heating, modules, panels, unit, or assembly;
3. Solar thermal air heating modules, panels, unit, or assembly;
4. Solar air conditioning or dehumidification of air; and
5. Other types of auxiliary modules serving any other type of function of purpose, and alternatives now know or in the future.

In a specific embodiment, the present invention provides an apparatus and method for a rack or frame that positions and holds the plurality of modules, including photovoltaic and/or thermal solar arrays. In one or more embodiments, the present rack or frame apparatus is formed by designs of rails, channels, struts, and other members having various designs and the like. In a specific embodiment, the rack or frame is typically affixed to a building structure such as a roof system or supported by a structural free standing ground frame or elevated frame system. In a preferred embodiment, the present invention provides a pan structure or device that serves as a lower region of a plenum for a thermal solar array. Of course, there can be various alternatives, modifications, and variations.

In a specific embodiment, the present invention provides a novel apparatus and method for an array of solar modules. In one or more embodiments, the apparatus and method provides an underside region of solar components, modules, or array that is confined, closed in, or restricted using a thickness of shaped material or structure to form a "pan" shaped structure for the underside region of the array or the like. In a specific embodiment, the shaped material or structure is configured in one or more ways as briefly described below.
1. A pan structure under a single solar component or module;
2. A continuous pan structure under either or both a row or column of solar components or modules;
3. A continuous pan structure under a group of solar components or modules in a portion of one or more arrays;
4. A pan structure under an entire thermal or photovoltaic array to encompass and integrate each of the solar components; and
5. A pan structure coupled to or underling modules, racks, frames and other array components in part or whole.

Again, one of ordinary skill in the art would recognize other variations, modifications, and alternatives. In a specific embodiment, the shaped material or structure, configure as the pan, is made of a suitable material having environmental, thermal, and structural integrity and resistance. In a specific embodiment, the shaped material or structure is made from ferrous or non-ferrous metals, plastic, or any other suitable material, combination of materials, and or layers of materials. In one or more embodiments, the pan structure can be formed from a sheet or plate like material, or can be integrally formed from a frame, channel, strut, or other components to create its functional shape, attachment, positioning, rigidity, or integration under the solar components, modules, or arrays. Further details of the present method and apparatus including pan structure can be found throughout the present specification and more particularly below.

In a specific embodiment, the present invention provides a thermal solar system having a fire resistant characteristics. In a specific embodiment, the system includes a thermal solar module having an aperture region and a backside region. The system has a shaped thickness of material having a first side and a second side. In a preferred embodiment, the shaped thickness of material is characterized by a fire resistant material. The material has a thickness suitable to be free from penetration of moisture according to one or more embodiments. The thickness of material also has a structural characteristic capable of maintaining a shape and coupling to the backside region of the thermal solar module according to one or more embodiments. The system also has an air plenum provided between the thermal solar module and the thickness shaped thickness of material. In a preferred embodiment, the system further has a frame assembly operably coupled to the shaped thickness of material to support the shaped thickness of material and the thermal solar module or other alternative module types.

In an alternative specific embodiment, the present invention provides a method of installing a solar module onto a building structure. In a specific embodiment, the method includes mounting a frame assembly integrally coupled with one or more pan structures to a building structure. As used herein, the term "pan" or "pan structure" is interpreted by ordinary meaning and should not unduly limit the scope of the claims herein to the explicit wording in the specification and features in the drawings. One of ordinary skill in the art would recognize other variations, modifications, and alternatives. In a specific embodiment, the present method includes coupling one or more solar modules comprising an aperture region and a backside region within the frame assembly such that the backside region and the one or more pan structures form a plenum region for fluid flow. Of course, there can be other variations, modifications, and alternatives.

In a specific embodiment, the present invention provides a thermal solar system having a fire resistant characteristic. The system includes a solar module having an aperture region and a backside region. The system has a shaped thickness of material having a first side and a second side. In a specific embodiment, the shaped thickness of material is characterized by a fire resistant characteristic including a thickness to be free from penetration of moisture. In a specific embodiment, the thickness of material has a structural characteristic capable of maintaining a shape and coupling to the backside region of the thermal solar module. The system also has an air plenum provided between the thermal solar module and the thickness shaped thickness of material and a frame assembly operably coupled to the shaped thickness of material to support the shaped thickness of material and the thermal solar module. The system also has a building structure holding the frame assembly. In a preferred embodiment, the building structure has an inner region having a first pressure. In one or more embodiments, the inner region can be an attic region or other inner building region or regions. In a specific embodiment, the system has a second pressure characterizing the air plenum. In a specific embodiment, the second pressure is equal to or less than the first pressure to cause a dynamic pressure on the solar module to be directed through the air plenum. In a preferred embodiment, the second pressure maintains the inner region of the building structure substantially free from water driven from the dynamic pressure during rain fall or wind.

In another specific embodiment, the present invention provides an integrated solar module capable of being easy assembled for thermal solar application. The module includes a solar panel device having an aperture region and a backside region. Additionally, the integrated solar module includes a shaped thickness of material characterized by a fire rating of at least A. The shaped thickness of material further is characterized by a mechanical strength capable of maintaining a thickness free from penetration of moisture and a shape to couple with the backside region. The shaped thickness of material includes at least a bottom plate, a first side wall, and a second side wall. Furthermore, the integrated solar module includes an air plenum provided between the backside region and the shaped thickness of material. The air plenum has an intake region and an output region. The intake region is located from a first end region of the first side wall to a first end region of the second side wall and the output region is located from a second end region of the first side wall to a second end region of the second side wall. The intake region is configured to receive air flows from ambient toward the output region. The air flows being optionally let to pass through either or both of the first side wall and the second side wall.

Many benefits are achieved by way of the present invention over conventional techniques. For example, the present technique provides an easy to use process that relies upon conventional technologies such as thermal solar modules and drive devices, although other elements can also be used. Additionally, the method provides a process that is compatible with the instant thermal solar system without substantial modifications to equipment and processes. Preferably, the invention provides for an improved solar module operation procedure, which is less costly and easy to handle. Such solar module operation system uses a shaped thickness of material or structure in the form of a pan structure, which is configured underlying a solar array, including its components, and integral with a rack structure according to one or more embodiments. In a preferred embodiment, the pan structure can be composed of a plurality of individual members or segments, which can be interconnected in a locking manner to form a continuous shaped structure underlying a solar array. Depending upon the embodiment, one or more of these benefits may be achieved. These and other benefits will be described in more detail throughout the present specification and more particularly below.

Various additional objects, features and advantages of the present invention can be more fully appreciated with reference to the detailed description and accompanying drawings that follow.

DETAILED DESCRIPTION OF THE INVENTION

According to the present invention, techniques related to operation of a thermal solar system are provided. More particularly, the present invention provides a method and system for using a back plate structure to form a plenum for a thermal solar system. Merely, by way of example, the present invention has been applied to a thermal solar module configured on a building structure, but it would be recognized that the invention has a much broader range of applications.

Figure 1:
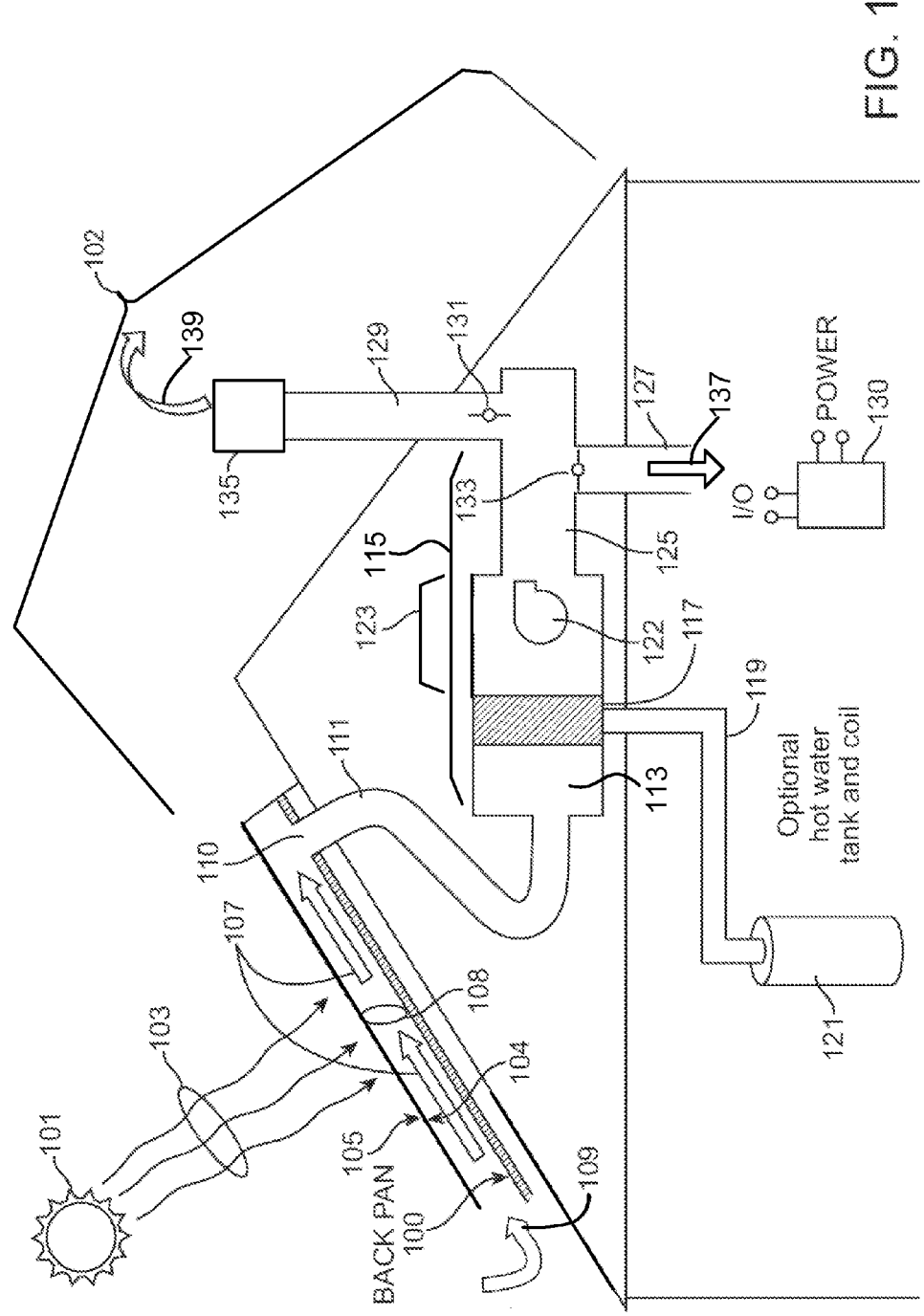
FIG. 1 is a simplified diagram of a thermal solar system according to an embodiment of the present invention.

FIG. 1 is a simplified diagram of a back plate structure 100 for a thermal solar system according to an embodiment of the present invention. This diagram is merely an example, which should not unduly limit the scope of the claims herein. One of ordinary skill in the art would recognize other variations, modifications, and alternatives. As shown, the thermal solar system 102 includes a plurality of thermal modules spatially configured as an N by M array, where N is an integer greater than 1, and M is an integer greater than 2 spatially disposed and attached to a building structure, such as a roof, building side, rack, or the like. In a specific embodiment, the plurality of thermal modules is configured to form a receiver (aperture) region 105 and a backside region 104. In one or more embodiments, the thermal solar modules can be combined with photovoltaic modules or solely thermal modules or photovoltaic modules configured for thermal use to provide a heat source. Of course, there can be other variations, modifications, and alternatives.

In a specific embodiment, electromagnetic radiation 103 from the sun 101 or other radiation source illuminates on the receiver region. In one or more embodiments, thermal energy is transferred through the solar module and applies the thermal energy to a working fluid 109 such as air, which traverses 107 in an upward direction through an air plenum 108 configured from at least the backside region. In a specific embodiment, the air plenum has one or more intake regions and one or more exit regions 110. In a specific embodiment, the one or more intake regions can be configured near a lower portion of the solar module array, although there can be other spatial locations. Additionally, the one or more plenum exit regions can be a single exit region or multiple exit regions disposed spatially in a configuration near an upper portion of the solar module array. Of course, there can be other variations, modifications, and alternatives.

In a specific embodiment, the present system includes a shaped structure or thickness of material coupled to the backside region to form the plenum. In a specific embodiment, the shaped structure is integrally configured with the rack structure or disposed underlying the various components of the solar module or thermal array. In a specific embodiment, the shaped structure or thickness of material can be the pan structure coupled to the backside region. In a preferred embodiment, the shaped pan structure has a suitable thickness, configuration and form to prevent rain water or moisture from penetrating from the plenum region through the pan, but can also be vented according to one or more embodiments. Further details of the shaped structure can be found throughout the present specification and more particularly below in reference to FIGS. 5 through 13. Of course, there can be other variations, modifications, and alternatives.

Referring again to FIG. 1, the system has a first duct 111 coupled to the one or more plenum exit regions 110. In a specific embodiment, the first duct can couple into a fluid flow region 115 having a fluid flow intake region 113 coupled to the first duct region, a fluid flow exit region 125, and a fluid drive region 123 spatially disposed between the fluid flow intake region and the fluid flow exit output region. As used herein, the terms "fluid exit region" "fluid flow intake region" "fluid drive region" and others are not intended to be limiting and should be interpreted by ordinary meaning. Also shown are valves or dampers 131 and 133 which respectively connect to air pathways 129 and 127 to an outside region via exhaust 135 for dumping exhaust air 139 or back into a building structure via exhaust 127 for providing heated air 137. Of course, there can be other variations, modifications, and alternatives.

In a specific embodiment, the system has an air moving device 122 comprising a drive device coupled to a blower device. In a preferred embodiment, the drive device is spatially disposed within the fluid drive region. In a specific embodiment, the drive device comprises an electric motor. That is, the drive device comprises an electric motor with high temperature windings, but can be others. In a preferred embodiment, the blower device comprises a fan device having a centrifugal configuration operably coupled to the drive device. Such blower device comprises a plurality of blades, which are configured to move high volumes of fluid and in particular air through the plenum. As shown, the drive device is disposed within a plenum region for fluid flow according to a specific embodiment. In a preferred embodiment, the fluid flow comprises air flow ranging in temperature from about 32 Degrees Fahrenheit to about 240 Degrees Fahrenheit.

In a specific embodiment, the system has one or more sensing device coupled to the controller device 130. In one or more embodiments, the controller device is coupled to one or more sensor devices operably coupled to the drive device. The one or more sensing devices are disposed spatially within a vicinity of the drive device according to a specific embodiment. In a specific embodiment, the sensing devices can be a thermocouple or other sensing device capable of receiving information that is indicative of temperature of the drive device. Of course, there are other variations, modifications, and alternatives.

In a specific embodiment, the system also has a controller 130 operably coupled to the air moving device. In a specific embodiment, the controller includes input/output for power, input/output for sensing devices; and input/output for control and/or feedback. As an example, the controller can be a computing system, including microprocessor device, memory, and input/output drivers and the like. Of course, there can be other variations, modifications, and alternatives.

Referring again to FIG. 1, the system has a second duct 125 coupled to the fluid flow exit region. As shown, the system can also include a heat exchanger 117 spatially disposed between the one or more exhaust regions and the air moving device to capture thermal energy in an efficient manner, while also reducing the temperature of fluid flow before it traverses over the drive device according to a specific embodiment. As shown, the heat exchanger couples to piping 119, which preheats a fluid, such as water for the hot water tank 121 or other heating apparatus. Further details of the present system and related methods can be found throughout the present specification and more particularly below.

Figure 1A:
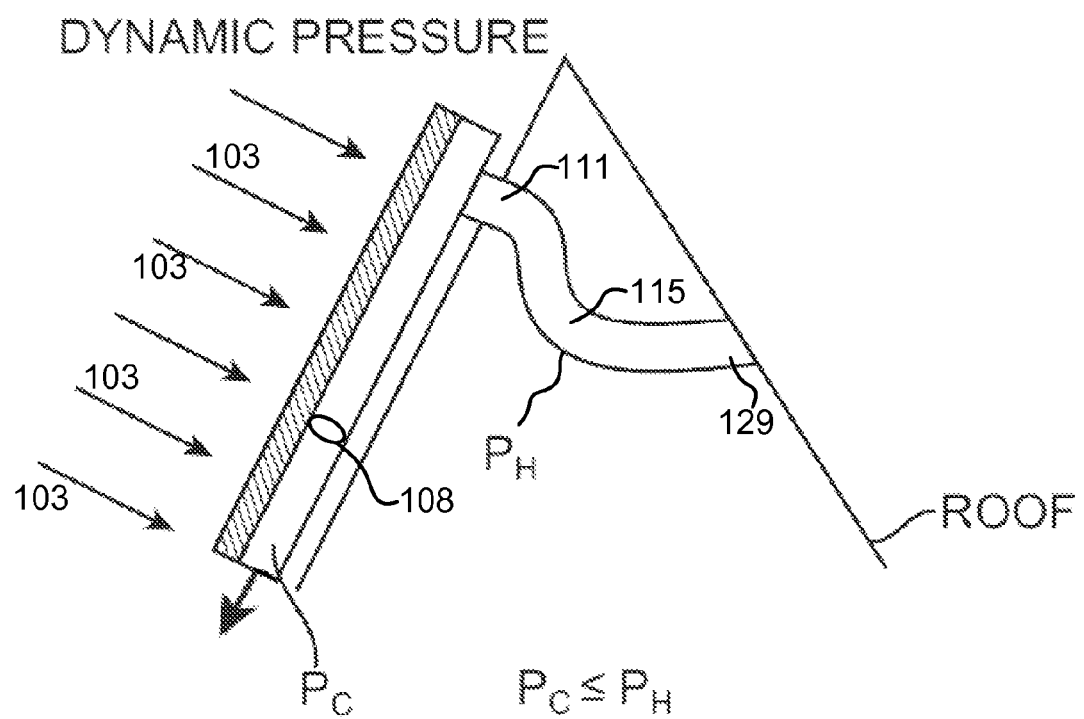
FIG. 1A is a simplified diagram of a velocity profile of a thermal solar system according to an embodiment of the present invention.

In a specific embodiment as illustrated by FIG. 1A, the present invention provides a thermal solar system having a fire resistant characteristic. The system includes a solar module having an aperture region and a backside region. The system has a shaped thickness of material having a first side and a second side. In a specific embodiment, the shaped thickness of material is characterized by a fire resistant characteristic including a thickness to be free from penetration of moisture. In a specific embodiment, the thickness of material has a structural characteristic capable of maintaining a shape and coupling to the backside region of the thermal solar module. The system also has an air plenum provided between the thermal solar module and the thickness shaped thickness of material and a frame assembly operably coupled to the shaped thickness of material to support the shaped thickness of material and the thermal solar module.

As shown, the system also has a building structure holding the frame assembly. In a preferred embodiment, the building structure has an inner region having a first pressure. In one or more embodiments, the inner region can be an attic region or other inner building region or regions. In a specific embodiment, the system has a second pressure characterizing the air plenum. In a specific embodiment, the second pressure is equal to or less than the first pressure to cause a dynamic pressure on the solar module to be directed through the air plenum. In a preferred embodiment, the second pressure maintains the inner region of the building structure substantially free from water driven from the dynamic pressure during rain fall or wind. That is, high wind and rain subjecting the aperture region cause water droplets to migrate into the plenum, which is at a lower pressure in the plenum region in reference to the inner building structure. In a preferred embodiment, the inner building structure is maintained free from moisture and water droplets. A detailed description of the present rack structure and thermal solar module are described more particularly below.

Figure 2:
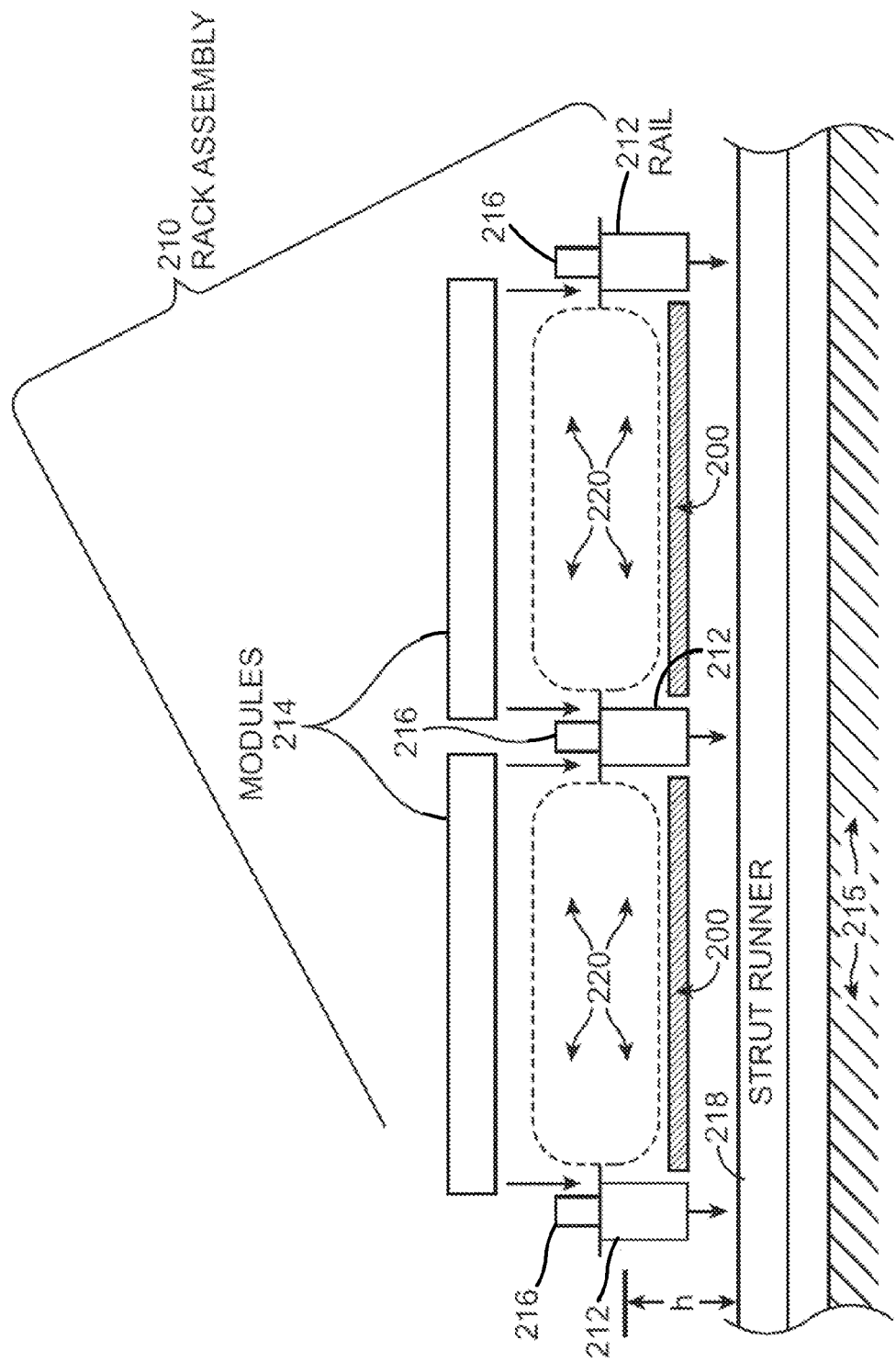
FIG. 2 is a simplified side view diagram of a rack assembly for a solar system according to an embodiment of the present invention.

FIG. 2 is a simplified side view diagram of a rack assembly for a solar system according to an embodiment of the present invention. This diagram is merely an example, which should not unduly limit the scope of the claims herein. One of ordinary skill in the art would recognize other variations, modifications, and alternatives. As shown, the rack assembly is form supporting solar modules, under one or more embodiments of the invention. In a specific embodiment, the rack assembly 210 includes a plurality of rail structures 212 that provide support for individual solar modules 214. When installed, the rail structures 212 support the individual solar modules 214 a given height h above an underlying body 215. The underlying body 215 may correspond to any surface, platform or structure on which solar modules 214 are mounted. For example, underlying body 215 may correspond to a rooftop of a commercial or residential building or other suitable configuration of beams, mounts, rails or other structure. The solar modules 214 may correspond to photovoltaic solar cells that convert solar energy into electricity, or alternatively, solar heating modules which directly generate heat using solar energy. Alternatively, the solar cells can be a combination of photovoltaic and thermal modules according to one or more embodiments.

According to one or more embodiments, the rail structures 212 are adjustable pair-wise, or in other combinations, in order to hold in place solar modules 214 of various dimensions and sizes. In one or more embodiments, the solar modules 214 are supported by a combination of retention structures 216. Each retention structure 216 may be provided with a corresponding one of the rail structures 212. In one or more embodiments, each retention structure 216 is a structural feature of the corresponding rail structure 212. For example, each rail structure 212 may comprise of multiple interconnected segments, and the retention structure(s) may be one of the interconnected elements. Alternatively, the retention structures 216 may be integrated or unitarily formed with the individual rail structures 212. Each retention structure 216 supports individual solar modules 214 by grasping edge segments. In one or more embodiments, the retention structures 216 and/or rail structures 212 are adjustable to grasp and support solar modules 214 of varying thicknesses and form an air passage or plenum. In a preferred embodiment, as illustrated by way of FIG. 2A, retention structures include a recessed region 216A, which extends along a length of the retention structure. Each of the recessed regions can act as a drain for water or fluid flow upon impact from rain, snow, or other entities that lead to fluids. Referring again to FIG. 2, an embodiment provides that a back plate structure 200 forms an air passage region or plenum 220 at the back side of the module 214. Of course, there can be other variations.

Figure 2A:
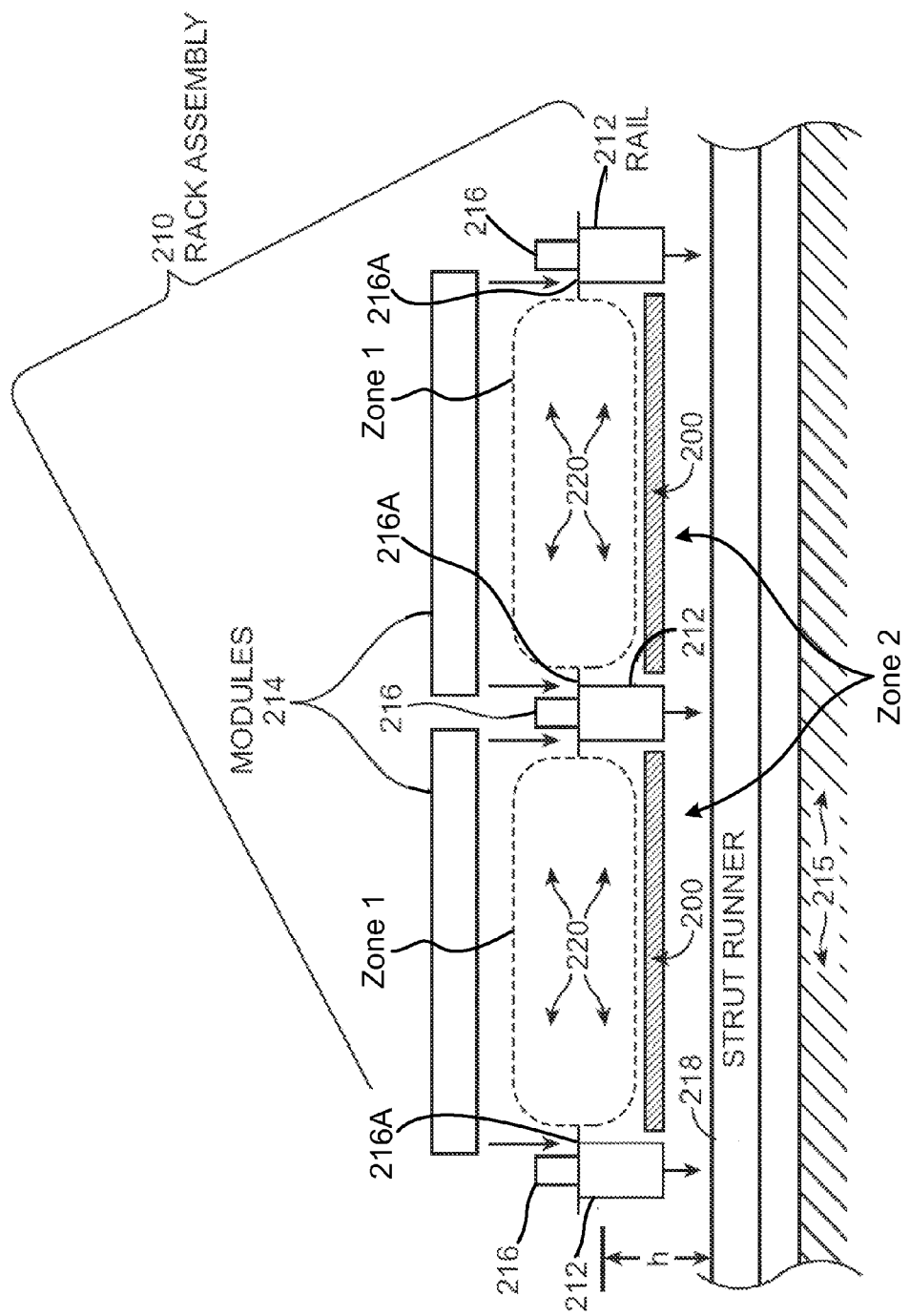
FIG. 2A is a simplified side-view diagram of a solar system according to an embodiment of the present invention.

In a specific embodiment, the present solar modules include at least two regions on each side of the shaped structure or pan structure, as illustrated by a simplified diagram of FIG. 2A. In a specific embodiment, the two regions includes an upper region (Zone 1) located between the module and the intermediate shaped structure; and a lower region (Zone 2) located between the intermediate shaped structure and a portion of the roof or alternative underlying surface or area. In a specific embodiment, Zone 2 provides for cooling of the panel using trapped air confined with a secondary surface for further insulation to reduce temperature of a roof and provides a barrier to prevent fire propagation. In a specific embodiment, the present solar modules can be configured to cool the solar modules in one cavity and heat the solar modules from another cavity (or zone). Using the shaped structure or pan structure, each of the cavities is decoupled from each other. In a specific embodiment, the shaped structure or pan, if metal, is free from contact with a portion of the roof structure. In a preferred embodiment, Zone 2 provides for break for fire, a thermal break, or additional insulation, which is similar to a triple plane or glaze insulation. Of course, there can be other variations, modifications, and alternatives.

In a specific embodiment, the two zones can act in conjunction or independently to provide for differing and independent functions, e.g., thermal conductivities, insulating effect, control of static pressures air flows, etc. Depending upon the embodiment, the two zones may act in unison or in opposition of each other. In a specific embodiment, one of the zones may be removing heat while the other zone is adding heat. Of course, there can be other variations, modifications, and alternatives.

In a specific embodiment, the upper zone provides for a thermal recovery cavity under the modules. The lower zone could operate independently to insulate the structure from heat transfer downward by maintaining cool air flow under the shaped structure. In a specific embodiment, the lower zone would prevent or limit high roof temperatures and heat transfer to the structure below. In a specific embodiment, the lower region Zone 2 could function as insulating in either summer (hot) and winter (cold) environments. In the summer, the roof and/or module becomes hot and the lower zone may be used to prevent the heat from passing downward. Cool, exterior air, would pass through the lower zone and carry away the heat to the roof ridge vent and flow it to the exterior (e.g., a thermal shield function). Additionally, the underside of the intermediate pan would have a "low-e" surface so it does not radiate heat downward into the structure. In winter, the system may maintain the heat at the underside of the intermediate pan. The Lower Region (Zone 2) would act as a static dead air space to hold the heat in the system. As the system increases in temperature, the air space would function as a "thermal break" to slow heat from the structure passing through. Of course, there can be other variations, modifications, and alternatives.

In a specific embodiment, the two zones can also be configured for condensation control. The two zones can be thermally controlled to prevent a condition where warm lower air encounters a cold surface. In such situations, condensation forms. Such condensation accumulated on the underside and forms water droplets. These water droplets lead to wetness and damage to the structure below. In open steel roof systems, the condensate falls on the ground or within the building structure or everything else placed in the air space. In a specific embodiment, the two zones can be configured to control condensation and other parameters that may cause undesirable influences. Of course, there can be other variations, modifications, and alternatives.

Referring again to FIG. 2, an embodiment provides that rail structures 212 are mounted indirectly to the underlying body 215 through use of a set of strut runners 218. Each strut runner 218 mounts to the underlying body 215 and to multiple rail structures 212, thus providing lateral support to maintaining the rail structures 212 upright, while at the same time providing a buffer between the individual rail structures 212 and the underlying body 215. The rail structures 212 may mount to the strut runners 218, and the strut runners may mount to the underlying body 215.

According to an embodiment, the rack assembly 210 forms a portion of a solar heat exchange system that uses heat generated from the solar modules 214 for anyone of various useful purposes. The heat exchange may be enabled by the formation of one or more plenum 220 between an underside of solar modules 214 and the underlying body 215. An individual plenum 220 may be defined in part by one or more of the rail structures 212, as well as the underlying body and possibly the underside of the solar modules 214. The individual plenum 220 may occupy at least a portion of the thickness defined by the height h. The solar heat exchange system may further include other components, such as a plurality of thermal panels, as well as air directors that draw air into the plenum 220, and/or push the air through the plenum. When installed as part of a solar heat exchange system, the rack assembly 210 may be positioned to supply heated air to such air directors, and to be proximate to the environment that is to receive or use the heated air. For example, the rack assembly 210 may be installed on the rooftop of a dwelling, and also direct heated air into a vent or air circulation system of the dwelling as part of its ability to heat air in the plenum 220. Useful purposes for generating heat from the solar modules 214 may include, for example, anyone or more of the following: (i) cooling the individual solar modules 214 (when photovoltaic) so as to make them more efficient, (ii) pulling air from the environment underneath the solar modules 214 for purpose of heating the air for another closed environment or system (e.g. for a house), and (iii) circulating air from the closed environment or system underneath the solar modules 214 to heat that air and use it for heat. Of course, there can be other variations, modifications, and alternatives.

Figure 3:
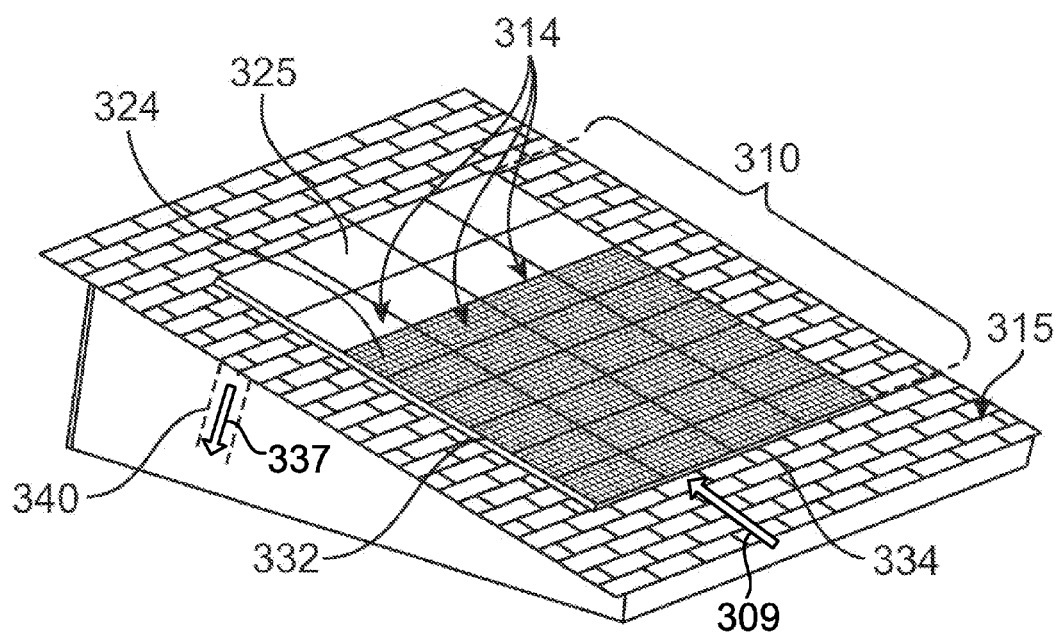
FIG. 3 is a simplified perspective view diagram of a solar system according to an embodiment of the present invention.

FIG. 3 is a simplified perspective view diagram of a solar system according to an embodiment of the present invention. This diagram is merely an example, which should not unduly limit the scope of the claims herein. One of ordinary skill in the art would recognize other variations, modifications, and alternatives. As shown, the rack assembly 310, which is installed, that supports a set of solar modules 314 over an underlying body 315. The rack assembly 310 may be structured and adapted to include features such as described with one or more embodiments of the invention. The underlying body 315 may correspond to, for example, a rooftop or roof structure of a building or dwelling. In general, the underlying body 315 may correspond to any area, surface or platform that can receive sunlight and be connected to a building, place or location that can collect or use the solar energy.

Embodiments of the invention contemplate that different types of solar modules 314 may be employed in various implementations and context. For example, as shown by the simplified diagram of FIG. 3, the solar modules 314 include photovoltaic modules 324 and thermal modules 325. Under one or more embodiments, the perimeter may include one or more open length 334 from which air from the environment is drawn. As will be described, plenums (not shown) may be provided between the rack assembly 310 and underlying body 315 for purpose of constraining airflow. Air drivers (not show) may drive (e.g. push or pull) air within the formed plenums. In a specific embodiment, the rack assemble 310 can include one or more sealed length 332, or in a specific embodiment the back plate (not shown) may be provided to confine and create the air plenum. The solar modules 314 generate heat, either through design or as an inherent byproduct. According to one or more embodiments, this heat warms the air as it is drawn from the environment and pulled through the plenums formed underneath the solar modules 314.

Numerous alternatives and variations are contemplated. For example, all of the perimeter of the rack assembly 310 may be sealed, but may also not be sealed, and air may drawn from within a dwelling on which the rack assembly 310 is provided. This air may be pushed through-plenums, then back into the dwelling when warmed. Alternatively, some or all of the open length 334 may be sealed, or conversely, portions of the sealed lengths 132 may be opened or perforated as part of an underlying plenum system. As shown, FIG. 3 illustrates an implementation in which heated air is directed into a duct 340 within a structure of the underlying body 315. For example, warm air may heat a dwelling on which the rack assembly 310 is installed, and the duct 340 enables the heated air to flow into the circulation system of the dwelling. As mentioned, the solar modules 314 may be formed by a combination of the photovoltaic modules 324 and the thermal modules 325. The photovoltaic modules 324 can generate some residual heat when receiving solar energy and converting the solar energy into electrical current. In contrast, the thermal modules 325 may directly convert the solar energy into heat at a higher efficiency. The use and number of thermal modules 325 may depend on the use of the heated airflow, as well as the environment where the rack assembly 310 is installed. For example, when the purpose of heating air in the channels is to supply warm air to a dwelling of the underlying body 315, the thermal modules 325 have more use in colder environments, while warm environments may require only use of photo voltaic modules 324. Even in cold environments, thermal modules 325 may be used to convert solar energy into hot air due to the high operating efficiency achieved by their designs, and additional components may be used to drive the hot air into the dwelling.

Figure 4:
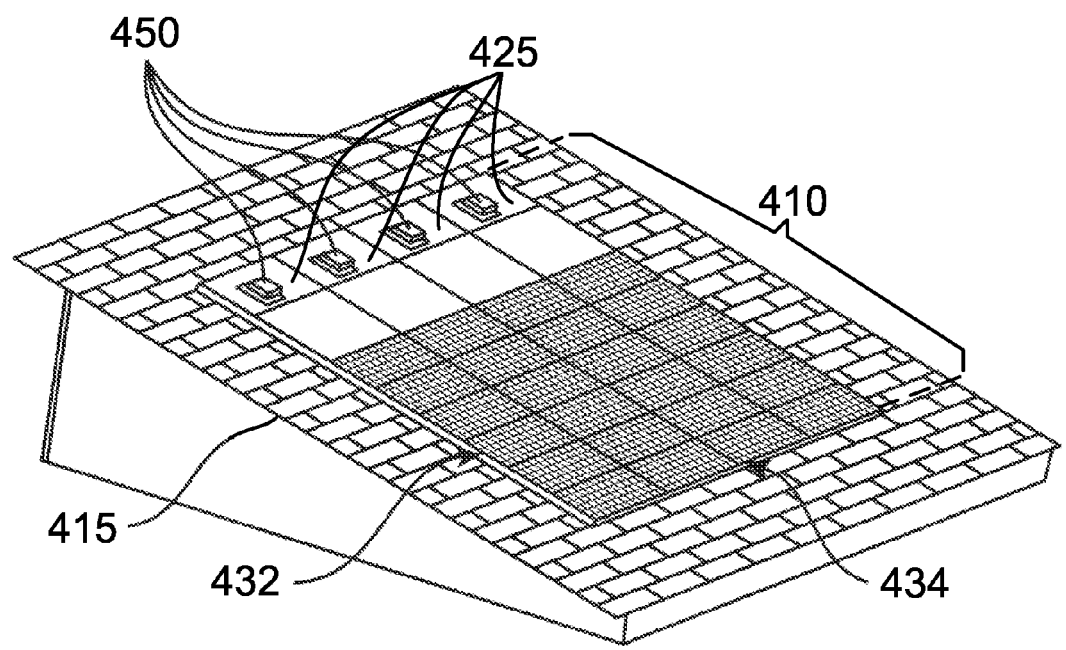
FIG. 4 is a simplified perspective view diagram of a solar system according to an alternative embodiment of the present invention.

FIG. 4 is a simplified perspective view diagram of a solar system according to an embodiment of the present invention. The Figure illustrates an implementation in which, multiple ventilation outlets 450 may be employed for directing heated air from under the rack assembly. As such, the ventilation outlets are located underneath the thermal modules 425. As shown with FIG. 4, the open length 434 of the perimeter is provided on one side, and the series of vents 450 are provided lengthwise on the other side of the perimeter formed by the rack assembly 410. For example, the vents 450 may guide the directed heated air inward into the structure of the underlying body 445. Of course, there can be other variations, modifications, and alternatives. As merely an example, further details of the rack assembly can be found in United States Patent Application Publication 20060118163 A1 in the names of Joshua Reed Plaisted, et al., commonly assigned, and hereby incorporated by reference herein. Of course, there can be other variations, modifications, and alternatives. Further details of the shaped structure underlying the solar array are described throughout the present specification and more particularly below.

Figure 5:
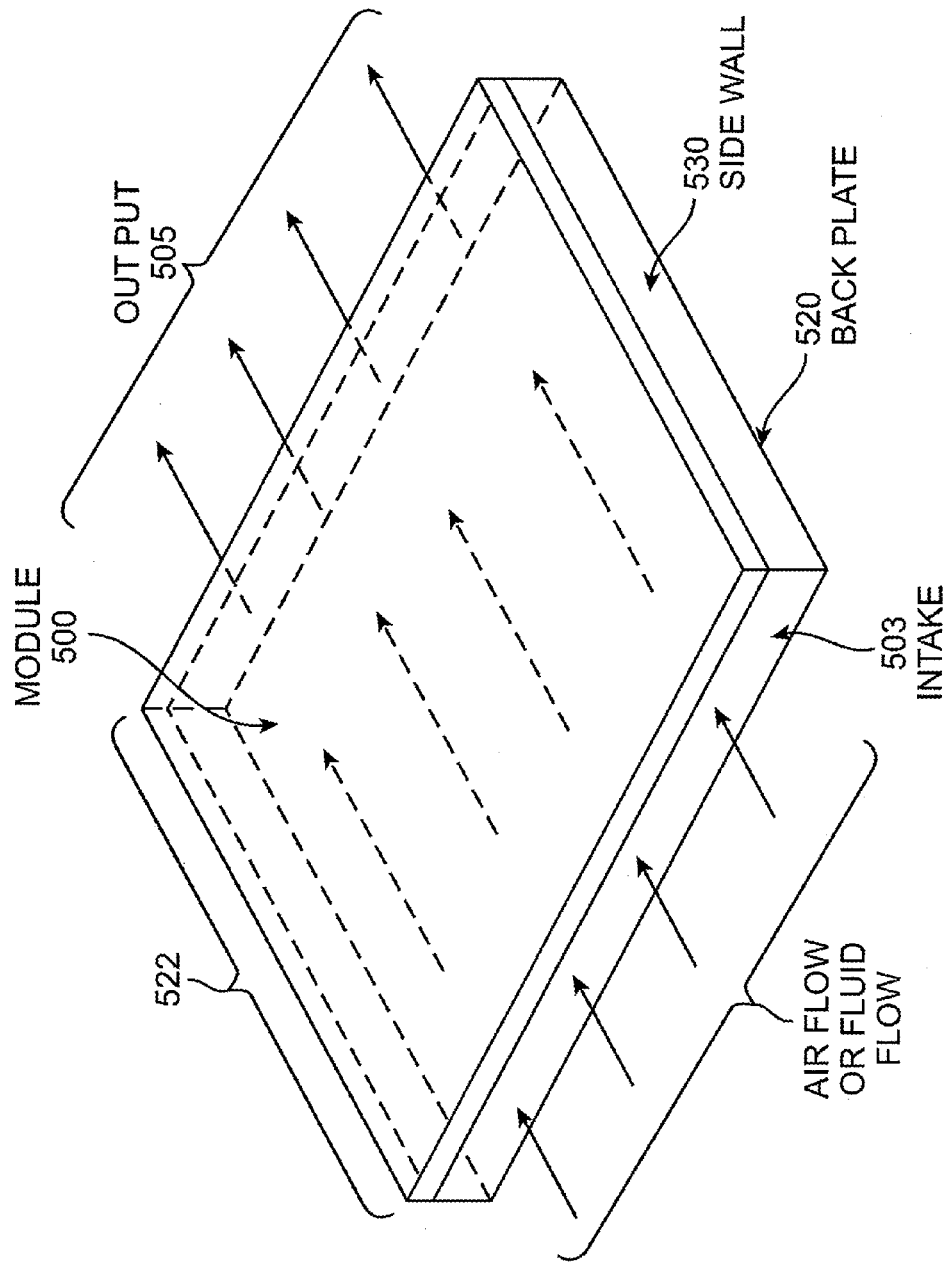
FIG. 5 is a simplified diagram of a pan structure for a thermal solar system according to an embodiment of the present invention.

FIG. 5 is a simplified diagram of a back plate structure 520 for a thermal solar system according to an embodiment of the present invention. This diagram is merely an example, which should not unduly limit the scope of the claims herein. One of ordinary skill in the art would recognize other variations, modifications, and alternatives. As shown is a rigid integrated pan structure, which couples to a backside of the solar module 500, or array according to a specific embodiment. In a specific embodiment, the rigid integrated pan structure is preferably a shaped thickness of material 520 having a first side and a second side. In a preferred embodiment, the shaped thickness of material is characterized by a fire resistant material, but can be others. The material has a thickness, form and connections, suitable to be free from penetration of moisture according to one or more embodiments. Of course, there can be other variations, modifications, and alternatives.

The thickness of material also has a structural characteristic capable of maintaining a shape and coupling to the backside region of the thermal solar module according to one or more embodiments. In a specific embodiment, the shaped thickness of material or shaped structure includes sidewall regions 530, which face parallel to each other, and intake 503 and exhaust regions 505, which also face parallel to each other. In a preferred embodiment, the shaped thickness of material or shaped structure can be a single continuous member or be one of a plurality of like structures that are coupled to each other to form a larger shaped structure, which is integral to the rack and solar module array. Further details of the larger shaped structure can be found throughout the present specification and more particularly below.

Figure 6:
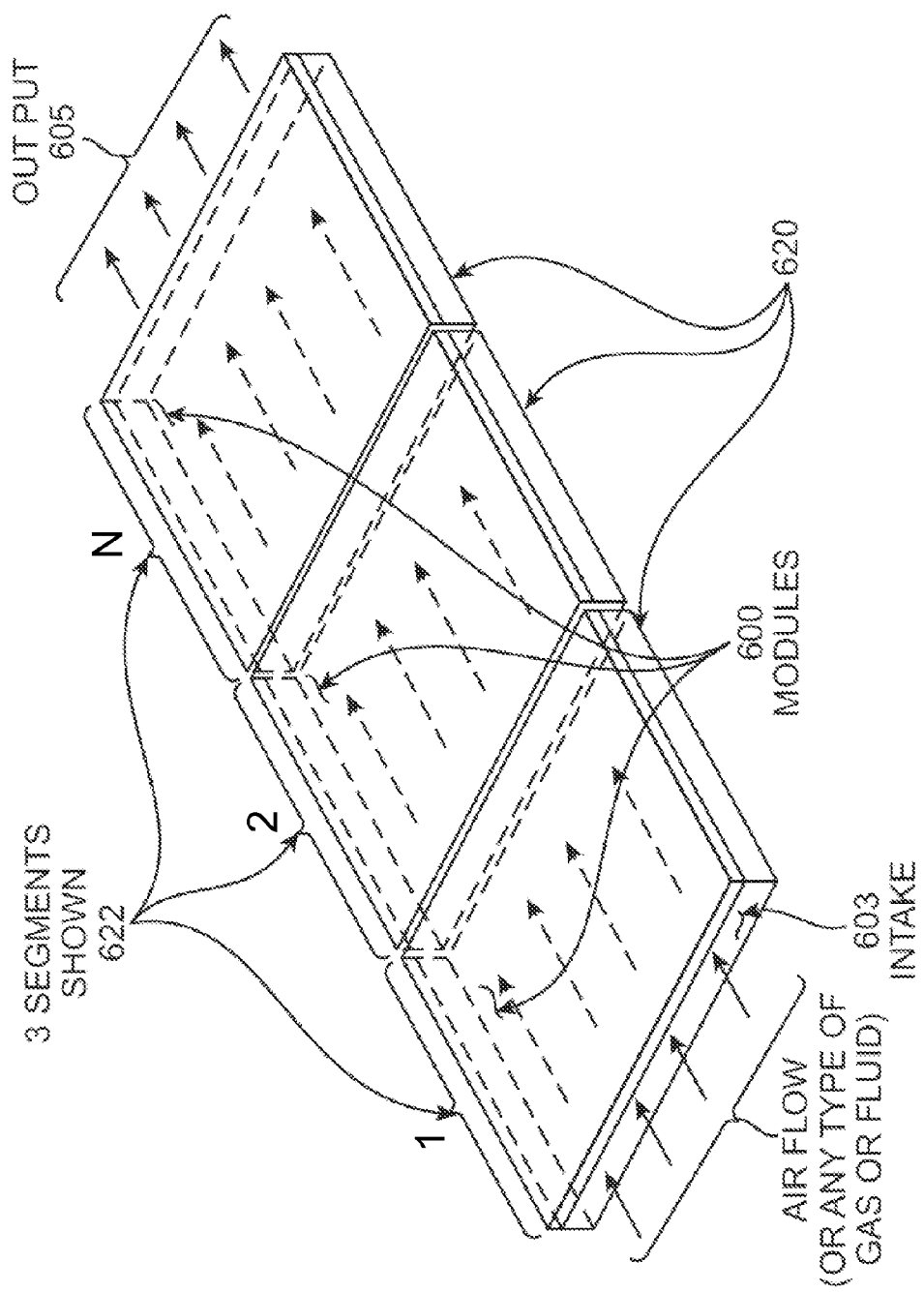
FIG. 6 is a simplified diagram of a pan structure for a thermal solar system according to an alternative embodiment of the present invention.

FIG. 6 is a simplified diagram showing a series of a back plate structure 620 for a thermal solar system according to an alternative embodiment of the present invention. This diagram is merely an example, which should not unduly limit the scope of the claims herein. One of ordinary skill in the art would recognize other variations, modifications, and alternatives. As shown, each of the segments 622 operably coupled to each other to form an integrated shaped structure, numbered 1 through N, where N is an integer greater than 2, extending from an intake region 603 to an output region 605. In a specific embodiment, the integrated shaped structure operably couples to the rack, solar module 600 or array. In a preferred embodiment, each of the segments is manufactured separately and installed either on the roof, raised frame, or on the ground. Each of the segments includes a border region for structural support according to a specific embodiment. Again, there can be other variations, modifications, and alternatives.

Figure 7:
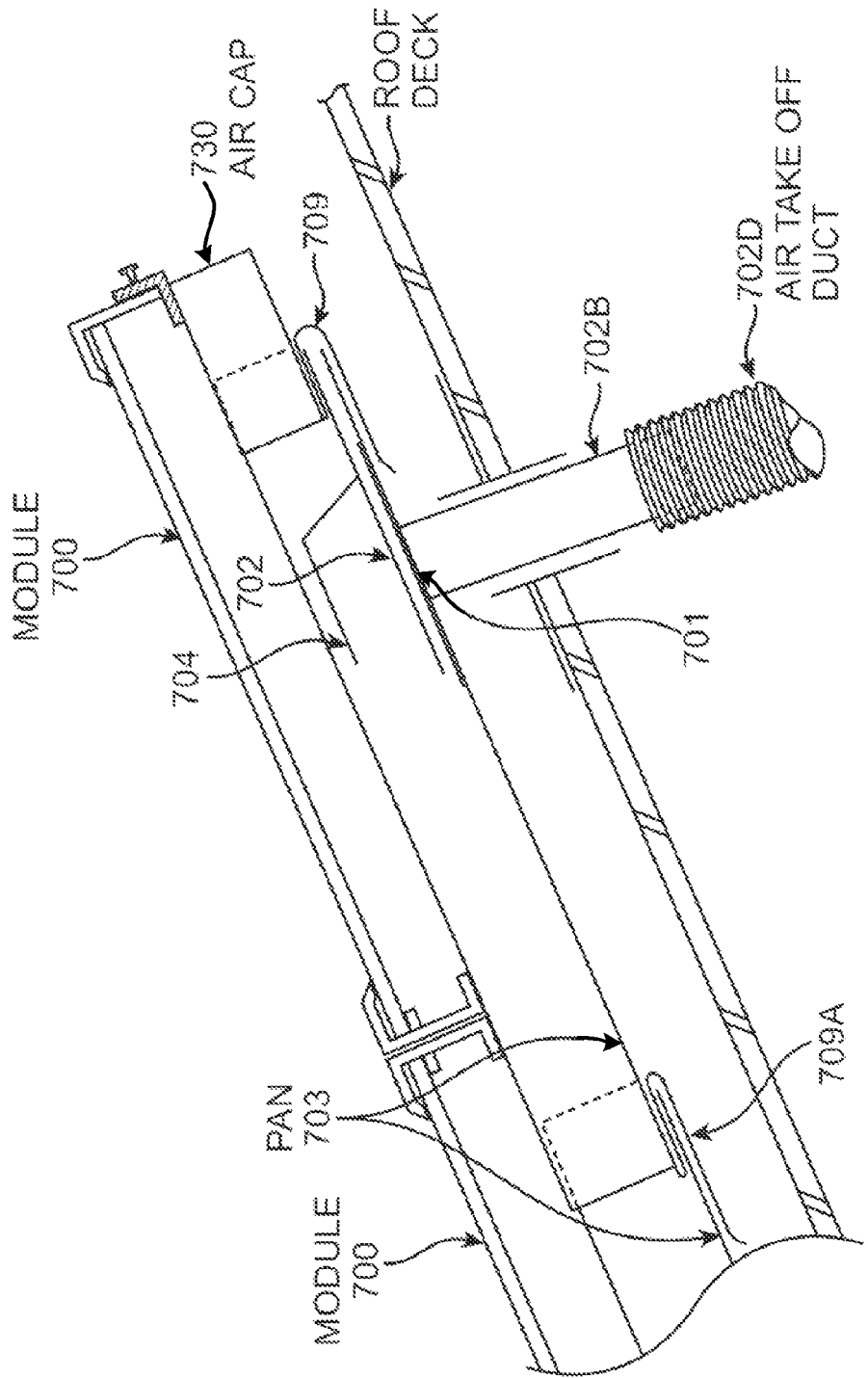
FIG. 7 a simplified diagram of side view cutaway of a solar module and pan structure according to an embodiment of the present invention.

FIG. 7 a simplified diagram of side view cutaway of a solar module and back plate pan structure according to an embodiment of the present invention. This diagram is merely an example, which should not unduly limit the scope of the claims herein. One of ordinary skill in the art would recognize other variations, modifications, and alternatives. As shown, the cut away includes modules 700 with under pan 703 structure according to an embodiment of the present invention. In a specific embodiment, an opening 701 is formed or cut through the pan structure 703 and the air take-off assembly 702 is inserted an air take off duct 702B through that opening, as shown. In a specific embodiment, the cutaway illustrates an air take off duct 702D attached to the air take off duct 702B, which can be a single duct or multiple duct assemblies according other embodiments. In a specific embodiment, the cut away also includes a protective water flashing assembly 704, which laps or covers the air take-off assembly. Depending upon the embodiment, a plurality of openings and respective ducts can also be configured on a lower region of the pan structure. Of course, there can be other variations, modifications, and alternatives.

In a specific embodiment, an upper edge of a water protective flashing is inserted into the "S" seam as located above a special region shown by reference numeral 709. In a specific embodiment, the top of the pan air stop or "air-cap" 730 is attached to the top of the pan assembly to seal the end portion of the pan assembly. In a specific embodiment, the pan assembly includes a plurality of pan structures, which couple to each other using an "S" seam 709A or can be lapped or configured with another suitable connection or attachment device. Also shown is the building structure or roof according to a specific embodiment. Of course, there can be other variations, modifications, and alternatives.

Figure 8:
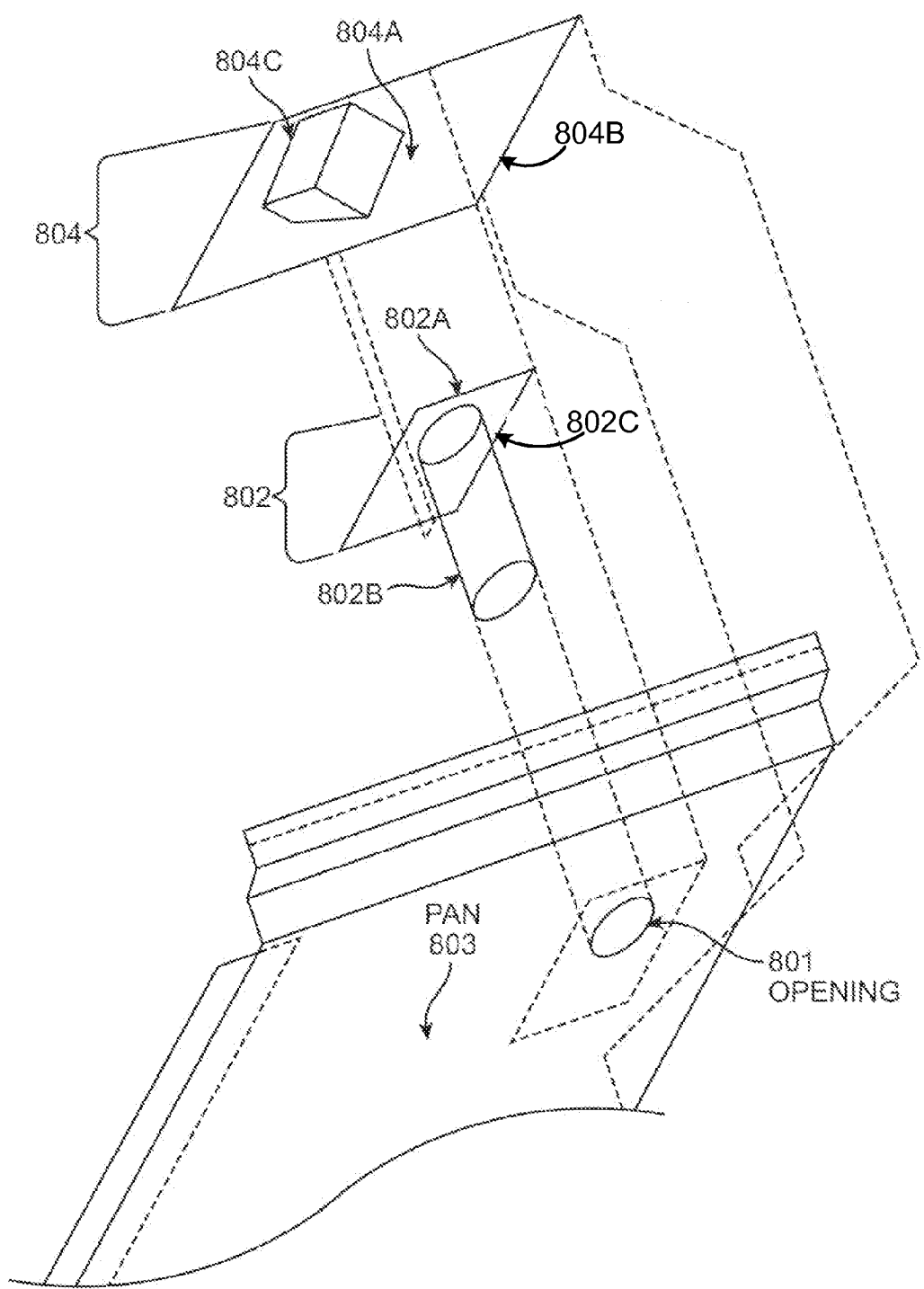
FIG. 8 is a simplified assembly diagram of a pan structure and associated ducting according to an embodiment of the present invention.
Figure 9:
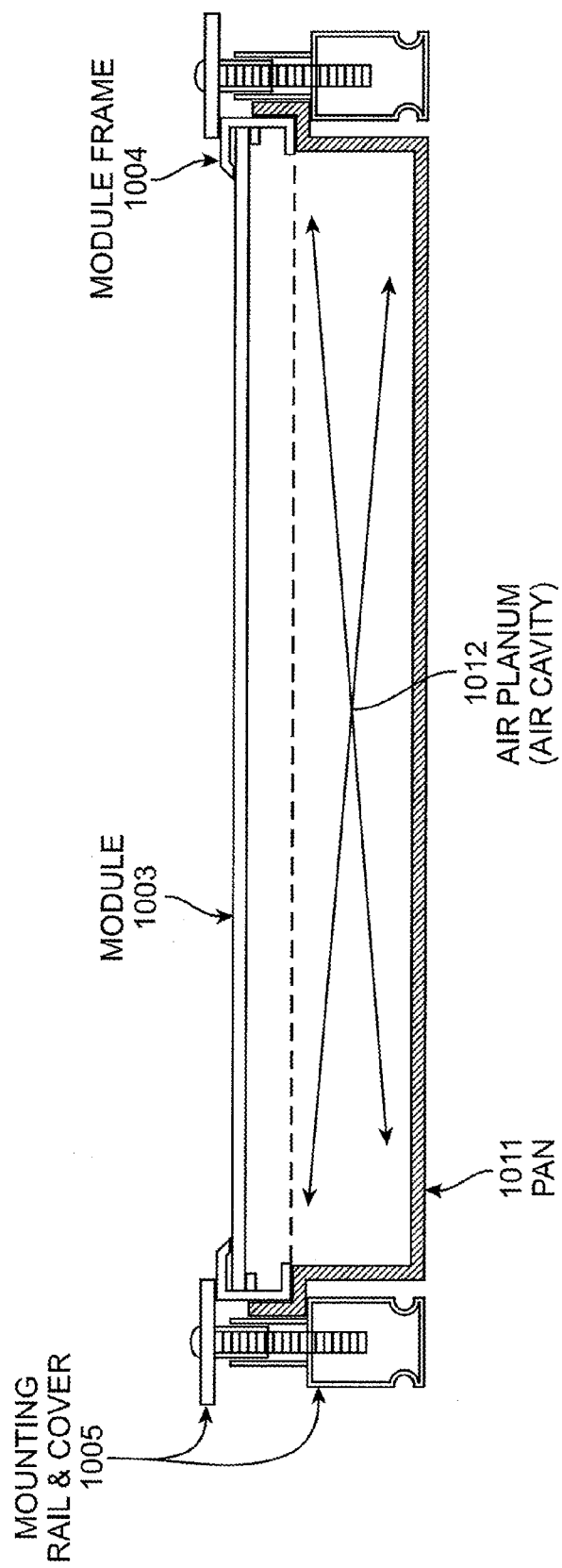
FIGS. 9 through 12 are simplified side-view diagrams of pan structures according to alternative embodiments of the present invention.
Figure 10:
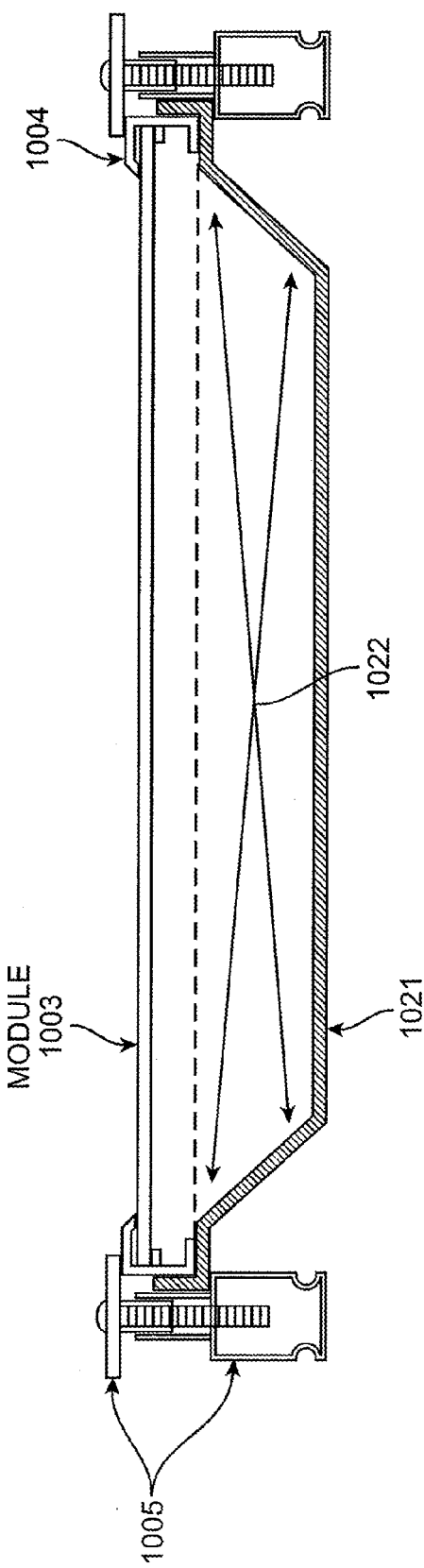
Figure 11:
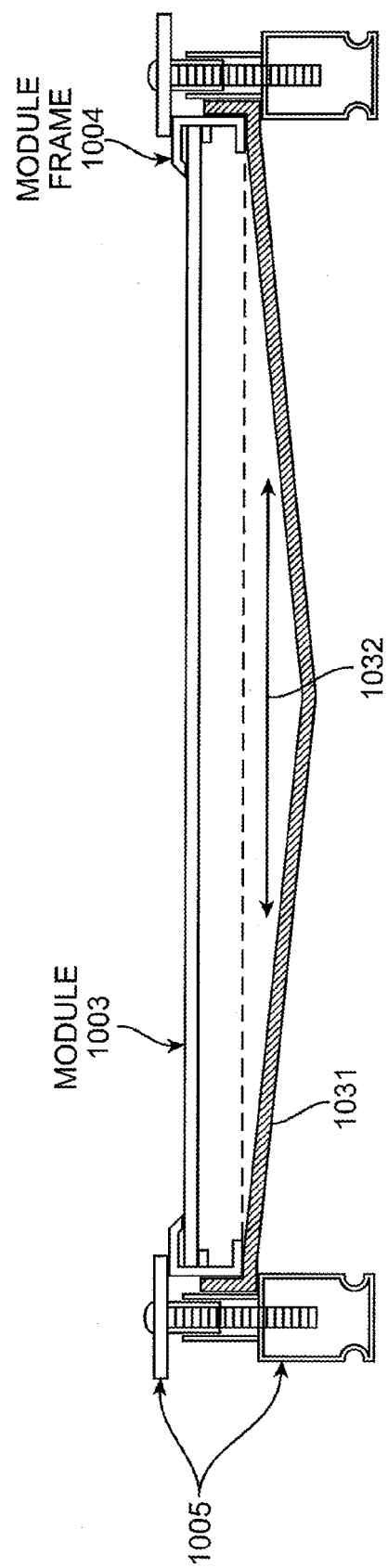

FIG. 8 is a simplified assembly diagram of a pan structure and associated ducting according to an embodiment of the present invention. This diagram is merely an example, which should not unduly limit the scope of the claims herein. One of ordinary skill in the art would recognize other variations, modifications, and alternatives. As shown, the assembly diagram illustrates alignment and installation of one or more elements including an air takeoff assembly, protective water flashing, among other features. In a specific embodiment, the assembly diagram includes an opening or hole cut 801 within a pan structure. In a specific embodiment, the hole cut in the pan provides an opening for air takeoff duct to pass through, although there can be other uses. As also shown is an air takeoff assembly 802, which includes top edge of flashing skirt 802A, air takeoff duct 802B, lower edge of flashing skirt 802C, among other features. In a specific embodiment, the pan includes a portion 803 of the under pan structure. Of course, there can be other variations, modifications, and alternatives.

In a specific embodiment, the protective water flashing assembly 804 for an upper edge of air takeoff assembly 802A is also illustrated. The assembly includes an upper edge of protective flashing 804A, which is aligned with the top edge of the pan structure according to a specific embodiment. The assembly also has a lower edge of protective flashing 804B, which laps over the top edge 802A of the air takeoff assembly according to a specific embodiment. Also shown is an air intake flashing 804C, which covers the opening 801 passed by the air take off assembly 802. Further details of alternative pan structures in side-view diagrams are illustrated below.

FIGS. 9 through 12 are simplified side-view diagrams of pan structures according to alternative embodiments of the present invention. These diagrams are merely examples, which should not unduly limit the scope of the claims herein. One of ordinary skill in the art would recognize other variations, modifications, and alternatives. In a specific embodiment, an air cavity or air plenum is formed under one or more solar modules or other modules. In a specific embodiment, the present invention provides a system for a pan under a solar component, module, or array. In other embodiments, an air cavity is within a solar component, module, or array. In one or more embodiments, the pan structure and air cavity are characterized by one or more shapes and configurations, including varying depths, offsets, or other features. In one or more embodiments, the air cavity can be disposed spatially under a module, within a module, or under and within one or more modules. Further details of various configurations are illustrated by way of the Figures, which will be described in more detail below.

Figure 12:
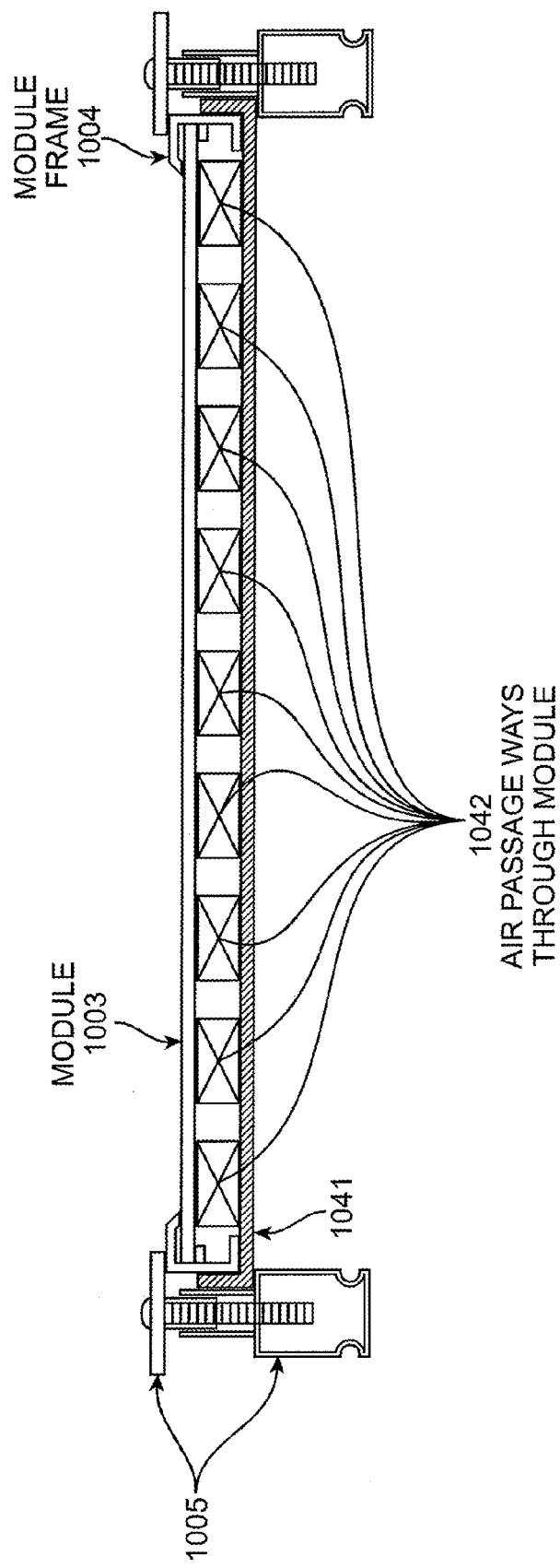
Figure 13:
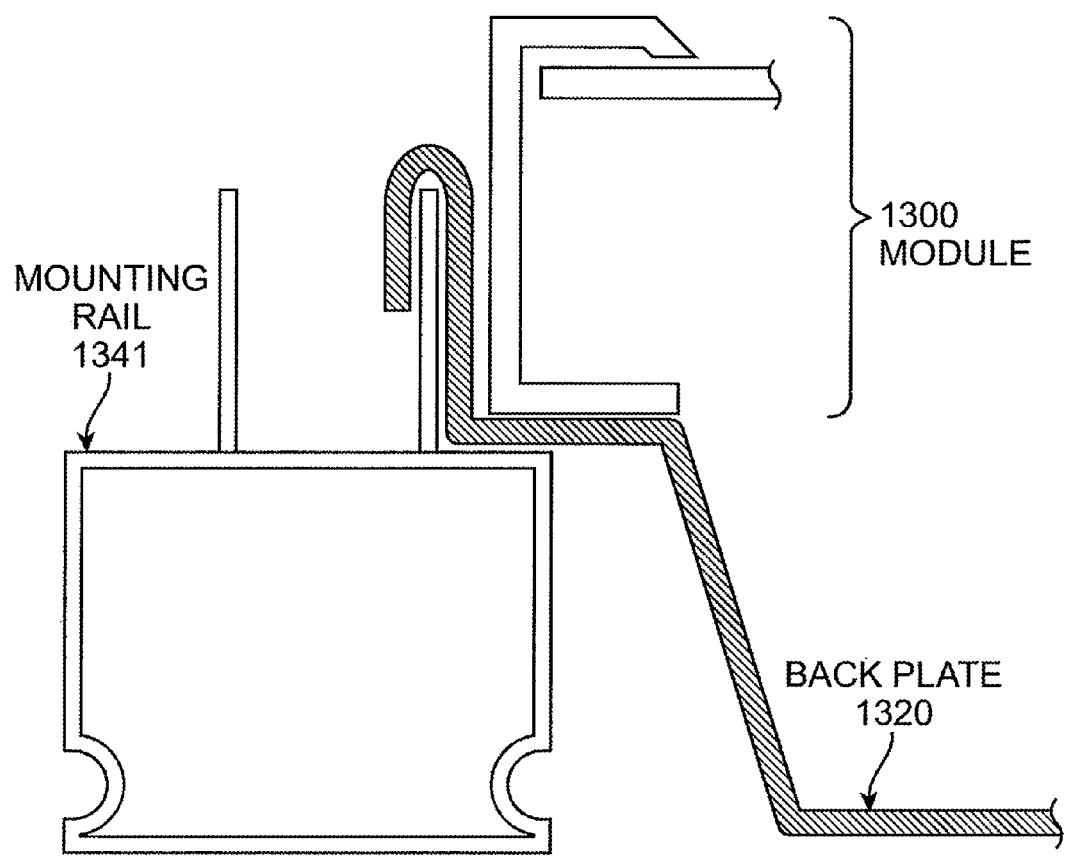
FIGS. 13 through 16 are simplified detailed diagrams of edge regions of the integrated pan, rack, and solar module according to embodiments of the present invention.
Figure 14:
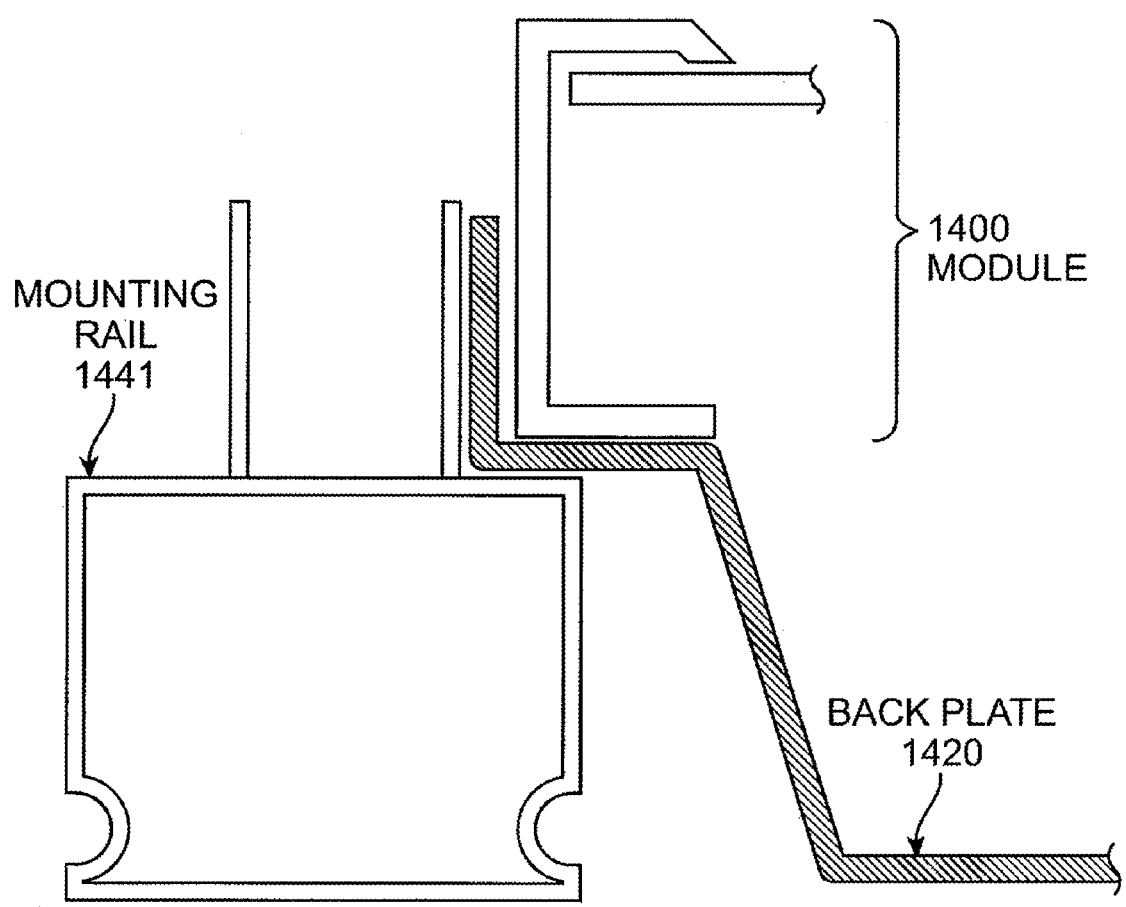
Figure 15:
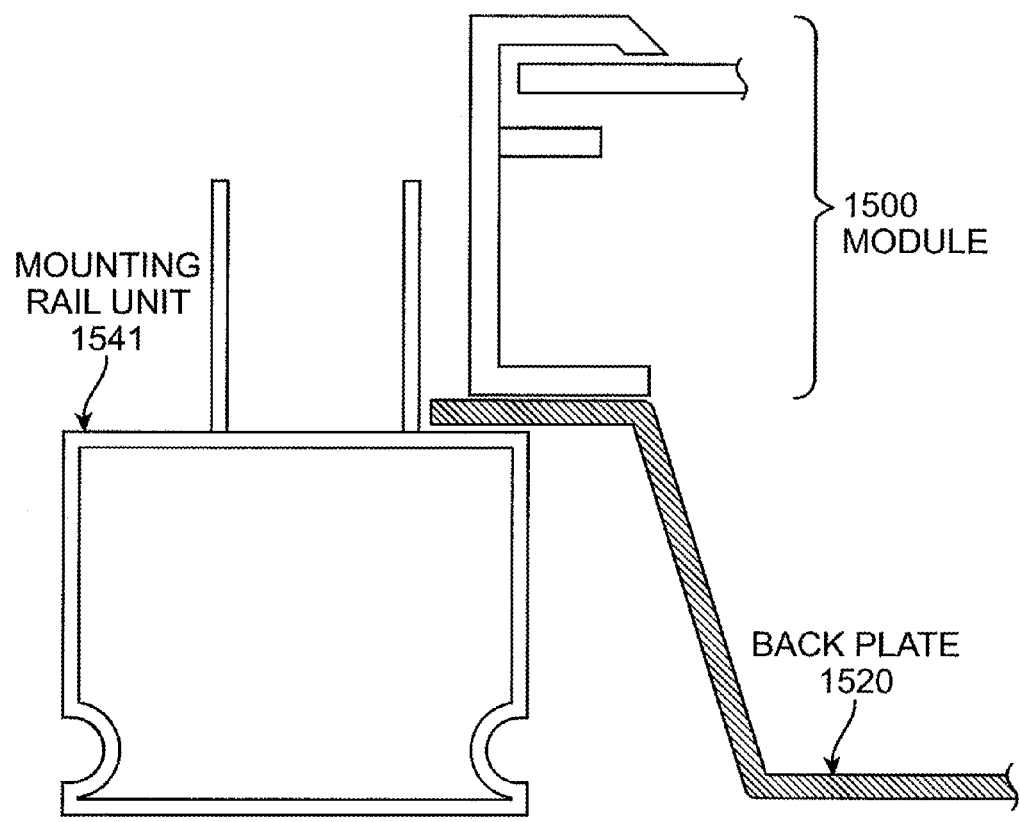
Figure 16:
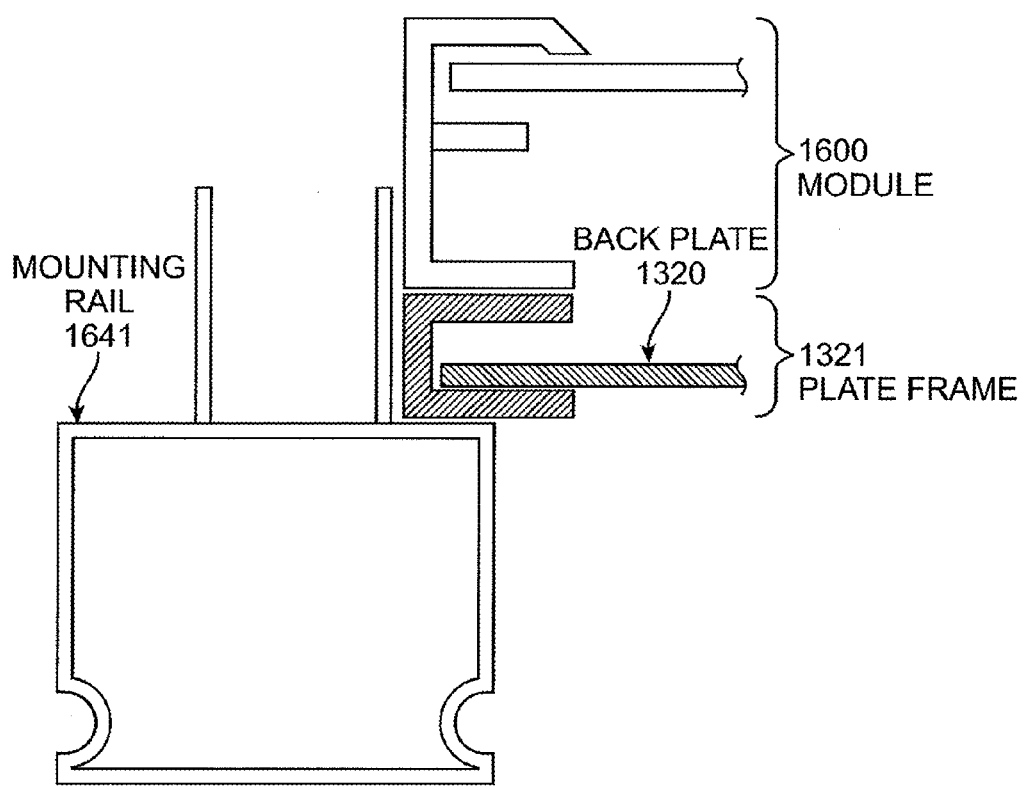

In a specific embodiment, the system provides an under solar component or module pan structure, as illustrated by reference numbers 1011, 1021, 1031 and 1041. In a specific embodiment, one or more air cavities are illustrated by way of reference numbers 1012, 1022, 1032, and 1042. As shown, the system includes solar component 1003, module frame integrated with the solar component 1004, mounting rack, strut or member 1005, among other features. In a specific embodiment referencing FIGS. 9, 10, and 11, the air cavity or air plenum as spatially located under the module pan structure 1011, 1021, 1031. Referring now to FIG. 12, the air cavity 1042 is spatially disposed as passing through the module or as integrated into the module or other solar module component. Of course, there can be other variations, modifications, and alternatives.

In a specific embodiment, the present system provides for passage of fluid flow such as air or other working medium. In a specific embodiment, the present system provides for a cavity or space, which defines an air plenum. The cavity or space allows for the passage, confinement, and control of a working fluid such as air, water, liquid or others according to a specific embodiment. The fluid flow occurs under or within a solar component, module or array. Depending upon the embodiment, the fluid flow is either passive in nature or active by way of mechanical mechanisms or devices. In a specific embodiment, the fluid flow (e.g., air or otherwise) may be used for various thermal transfer purposes. As an example, the thermal transfer purposes include, but are not limited to:

1. Thermal heat transfer from the photovoltaic component, or modules. In a specific embodiment, heat transfer can be utilized to draw away heat from the photovoltaic component thereby cooling and/or reducing the temperature of the component and limit a high elevated temperature associated with solar gain of the component or module. In a specific embodiment, one or more benefits would be achievable by reducing, limiting, or lowering the temperature of the photovoltaic component, as described below.

i) Improved photovoltaic efficiencies and power generation;

ii) Thermal expansion associated with elevation in temperature of the photovoltaic component and internal structure is reduced or minimized (which leads to lower internal stresses of the photovoltaic material to improve the photonics life and longevity, among other factures.

2. Thermal heat transfer to the fluid (air or otherwise). In a specific embodiment, thermal gain to the fluid occurs passively or actively. Furthermore, thermal gain can be transported, stored or converted to provide heat energy and power to the photovoltaic structure, other components, and systems.

3. Thermal heat transfer to the photovoltaic component or modules limit thermal contraction of the photovoltaic structure during exposure to cold or extreme temperature conditions. In a specific embodiment, thermal conduction is reduced, which leads to lower or reduced associated internal stresses in the photovoltaic material to improve life and longevity of the photovoltaic component or module. Of course, there can be other variations, modifications, and alternatives.

In a specific embodiment, the present system and method also includes one or more intermediary surfaces, which can constrain air flow. In a specific embodiment, ventilating one or more spatial area(s) over an upper region or top of the pan structure removes heat build up at the pan structure. That is, the ventilation leads to a reduction of heat transfer through the pan structure to its underside according to one or more embodiments. In a specific embodiment, any reduction of heat transfers can insulate and/or protect regions underlying the pan structure from thermal gain.

In other specific embodiments, the present invention can also provide one or more of the following features: weather water/weather protection; fire rated assembly involving intermediate ferrous or non-ferrous material; Template for achieving rail spacing; Strengthening or stiffening the solar array system through mechanical coupling with the pan structure; thermal platform onto which the photovoltaic absorber material are manufactured; and others. Of course, there can be other variations, modifications, and alternatives.

FIGS. 13 through 16 are simplified detailed diagrams of edge regions of the integrated pan, rack, and solar module according to embodiments of the present invention. These diagrams are merely examples, which should not unduly limit the scope of the claims herein. One of ordinary skill in the art would recognize other variations, modifications, and alternatives.

Figure 17:
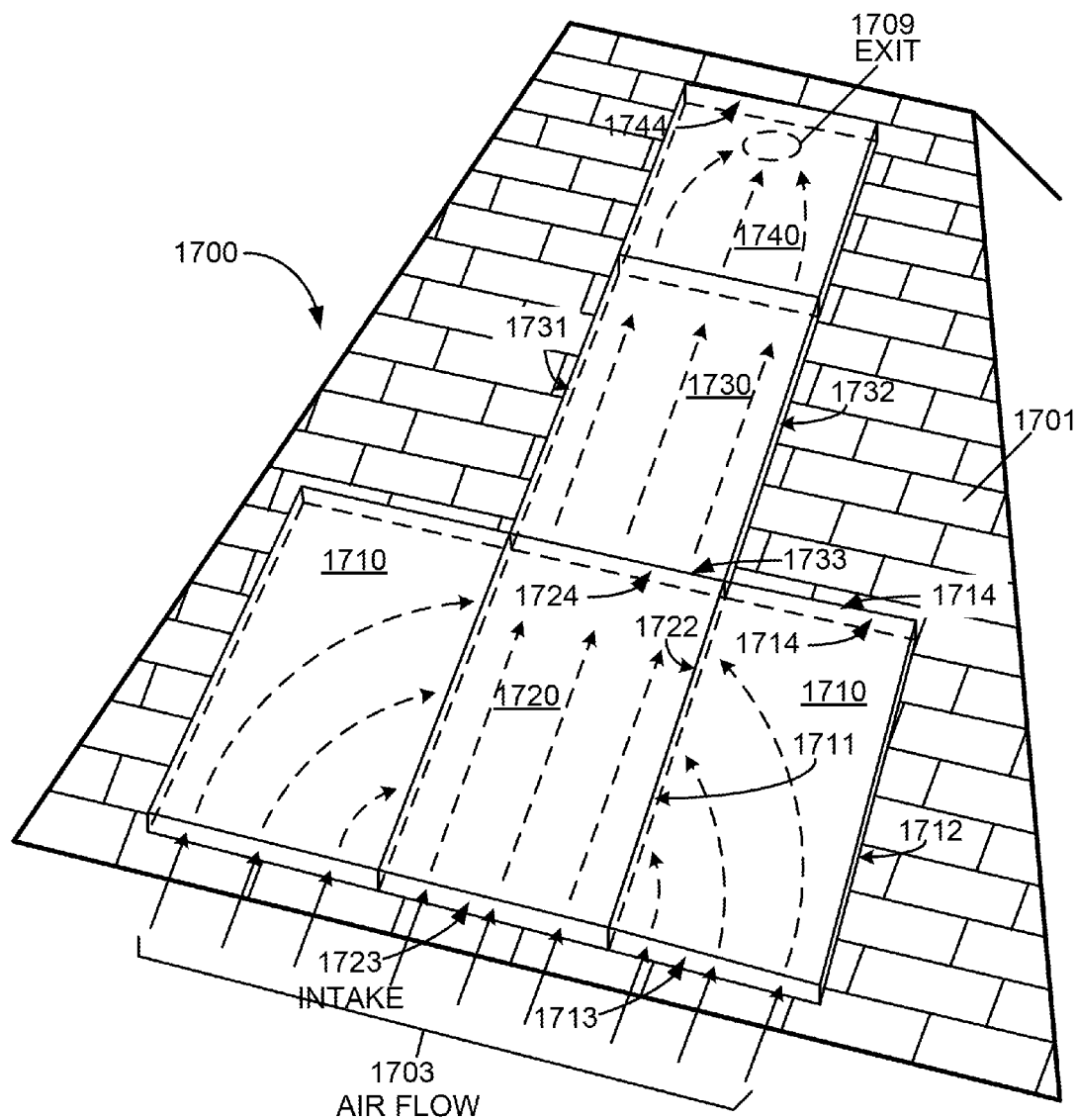
FIG. 17 is a simplified diagram of a thermal solar system assembled from multiple integrated solar modules according to an alternative embodiment of the present invention.

FIG. 17 is a simplified diagram of a thermal solar system assembled from multiple solar modules according to an alternative embodiment of the present invention. This diagram is merely an example, which should not unduly limit the scope of the claims herein. One of ordinary skill in the art would recognize other variations, modifications, and alternatives. As shown, an integrated thermal solar system 1700 is installed over a roof 1701 of a building structure for providing thermal solar energy applications. In an embodiment, the integrated thermal solar system 1700 is assembled by several solar modules 1710, 1720, 1730, 1740 (and more) coupled with one or more mounting rack structures (not explicitly shown). These solar modules 1710, 1720, 1730, 1740 are mounted one next to another in either an end-to-end direction up to N number of rows or a side-to-side direction up to M number of columns. The N number and M number can be respectively selected from 1 to an integer greater than 1. Depending on areas and shapes available on the module deployment position (i.e., roof) 1701, in a specific embodiment, the integrated thermal solar system 1700 can be a regular N×M configuration but the N number and M number are independently selected. For example, for a triangular or trapezoidal shaped roof, the M number at the top row (or top two rows or more) may be smaller than the M number at the lower rows. As shown in FIG. 17, integrated thermal solar system 1700, which is assembled from photovoltaic modules 1710, 1720 and 1730 having an aperture region exposed for receiving sun light and converting light energy to electric energy, as well as added at the top row with a thermal solar module 1740 having an aperture region exposed for receiving sun light and converting light energy substantially to thermal energy. For example, the photovoltaic module 1730 is substantially the same as the photovoltaic module 324 in FIG. 3. The thermal solar module 1740 is substantially the same as the thermal solar module 325 in FIG. 3.

As the photovoltaic modules also unavoidably generate heat as a side product of the solar energy production, the thermal energy from both the photovoltaic (PV) module and the thermal solar module is utilized according to embodiments of the present invention by operably transferring airflows in an interconnected air plenum structure associated with each integrated solar module (either a PV or a thermal module). In a specific embodiment, each integrated solar module, for example module 1710, includes a solar panel device having an aperture region on top and a backside region. The solar panel device has a fixed geometrical shape configured to have its backside region coupled with a shaped thickness of material to form an integrated module. The shaped thickness of material, also called a pan structure, is a sheet material characterized by a material having a fire rating of at least A and mechanical strength capable of maintaining a thickness free from penetration of moisture and a shape for coupling with the backside region of the solar panel. Additionally, the shaped thickness of material includes a bottom plate connected to a first side wall 1711 and a second side wall 1712 configured to be coupled or integrated directly with a backside region of the solar panel device (PV or Thermal).

By coupling of the shaped thickness of material with the backside region of the solar panel device, the solar module is provided with an air plenum structure. The air plenum is a volume of space confined between the backside region and the bottom plate from the first side wall to the second side wall. In an embodiment, the air plenum is configured to receive an air flow from ambient via an intake region located at a front end area between the of the first side wall to the second side wall. The air flows enter the air plenum via the intake region and are further guided toward an output region located at a back end area between the first side wall and the second side wall. In an embodiment, the intake region is free of the shaped thickness of material or is installed with a front end plate coupled to the shaped thickness of material. The output region can be installed a back end plate coupled to the shaped thickness of material or can be added by a bar member across the bottom plate from the first side wall to the second side wall for strengthening the shaped thickness of material.

Figure 19:
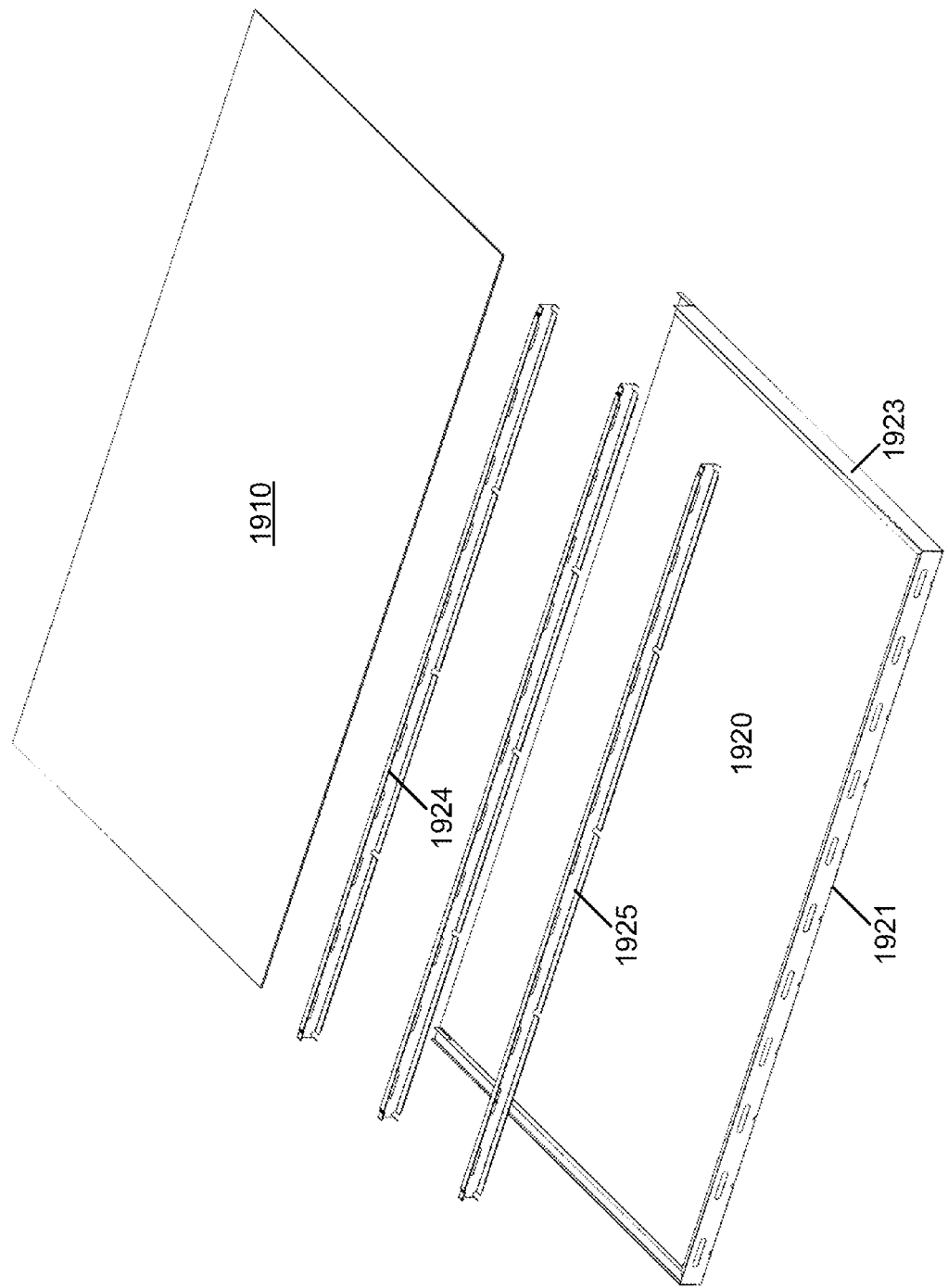
FIG. 19 is an exemplary diagram of an integrated solar module with a unibody frame structure and strengthening bars according to an embodiment of the present invention.

In a specific embodiment shown in FIG. 17, the front end plate 1713 is disposed at the intake region, and the back end plate 1714 is disposed at the output region of the air plenum associated with the module 1710. The front end plate 1713 is configured to have one or more openings to allow air to flow through. The back end plate 1714 is configured to either have one or more openings to allow air to flow through or have a solid body without holes to contain the air. In an implementation, the shaped thickness of material is a frame structure that is assembled from individually manufactured frame members including the bottom plate, the front end plate, the back end plate, the first side wall and the second side wall. In a specific embodiment, either or both the first side wall and the second side wall can be made from a solid piece of material without holes or a sheet material with one or more openings to allow air inside the air plenum to pass through. In another implementation, as shown in FIG. 19, the shaped thickness of material is a unibody structure made from a single piece of material in certain shapes to couple with the solar panel device. The unibody structure includes at least the bottom plate, the first side wall, and the second side wall, and optionally includes a front end plate at the intake region and one or more bar members disposed at the output region and some middle regions across the bottom plate for strengthening the shaped thickness of material (see FIG. 19). Of course, there can be other variations, alternatives, and modifications.

The system assembly configuration mentioned above leads to an integration of two integrated solar modules in a row along the side-to-side direction. For example, a first side wall 1711 of a first module 1710 is coupled with a second side wall 1721 of a second module 1720 as its nearest neighbor in the first row along the side-to-side direction. In a specific embodiment, each of the side walls of the integrated solar module includes a coupling structure that can be attached from either side with a mounting rail (not explicitly shown in FIG. 17) fixedly disposed along the side wall direction. Therefore, the system assembly along the side-to-side direction is supported by multiple mounting rails in parallel. Depending on the available area of the roof, the system assembly can include one or more integrated modules in each row and for every coupling joint there is a mounting rail disposed for support.

The system assembly configuration mentioned above also leads to an integration of two integrated solar modules in a column along an end-to-end direction. For example, a first module 1720 is disposed in a position in a first row and a second module 1730 is disposed next to the module 1720 in a second row in a column by coupling its end region 1733 with the end region 1724 of the module 1720. In a specific embodiment, a back end plate (e.g., 1724) of an integrated solar module (e.g., 1720) includes a coupling structure (detail not shown) configured to engage with a front end plate 1733 of another module (e.g., 1730) along the end-to-end direction. As mentioned above, each module is supported by mounting rails along its side walls. The system assembly along the end-to-end direction provides one or more integrated modules in each column confined by two mounting rails. Depending on the available area of the roof, the system assembly can include more modules row-by-row in some columns than other columns. In another specific embodiment, the thermal solar module 1740 usually is disposed in a last row of the column, although no restriction in the embodiments of the present invention on where different types of modules are disposed.

The system assembly configuration automatically provides a combined aperture region and backside region as well as an integrated or interconnected air plenum under the combined backside region. Specifically, the front end plate, back end plate, and side walls of each integrated solar module can be optionally configured to be fully open or have one or more through-holes so that the air plenum structure associated with each module is connected with a neighboring air plenum structure to form an interconnected air plenum. Depending on the configuration of the system assembly 1700, the modules disposed at the first row are configured to have the intake region of each regional air plenum become part of intake regions of the interconnected air plenum. For example, the intake region 1713 or 1723 is configured to receive air flows 1703 from ambient region into the integrated air plenum. The air flows 1703 pass through the air plenum associated with the module 1720 toward the back end region 1724. Further, any module disposed at a next row (e.g., 1730) is configured to have an opened frame member 1733 or a front end plate with holes so that the air flows 1703 can continue to flow in the interconnected air plenum along the end-to-end direction. The thermal energy transferred from the backside region of each solar panel thus is carried by the air flows along the way inside the interconnected air plenum. Any module (e.g., 1740) disposed at a last row includes a back end plate (e.g., 1744) which is made by a solid body without holes to contain the air flows within the air plenum. Optionally, this module is a thermal solar module with a maximum M number among the assembled modules and the air plenum associated with this module collects all heated air flows from rest part of the integrated air plenum. The air plenum (e.g., 1740) thus is configured to have an exit region 1709 built in the bottom plate (or the back end plate) to allow the air flows being extracted out of the interconnected air plenum. The extracted air flows further can be guided through the roof 1701 and be processed before delivering thermal energy to the building structure for various applications.

Depending on the available area and shape of the roof 1701, some columns of the assembly system 1700 has smaller number of rows (assuming the Nth row is last row). As seen in a specific example in FIG. 17, only the middle column has N=3 row module including an exit region 1709. The modules disposed at the edge columns of the integrated thermal solar system then have a side wall (e.g, the second side wall 1712 for module 1710) located at the edge and another side wall (the first side wall 1711) coupling to another module. Thus, the side wall (1712 or 1732) at the edge is made with a solid body to prevent air flows from leaking out, while the side wall (1711) at the inner side can include one or more openings or holes to allow air flows from its own air plenum to pass into a neighboring air plenum. In another example, this module (1710) is disposed at a last row of this column and it is not one (1740) with a highest row number (N=3), the back end plate (1714) also can be made with a solid body without holes to contain the air flows within but allowing the collected air flows to pass from the side wall to a neighboring air plenum and eventually be guided throughout the integrated air plenum toward the exit region (1709).

As mentioned before, a mounting rail is used to support or mount the side walls from each side. For any mounting rail having two side walls joined together, optionally the mounting rail includes one or more openings or through-holes that substantially matching with the one or more openings in the side walls so that the air plenums are interconnected to allow the air flows to pass through. For any module (e.g., 1720) that is located in the middle column to have neighbor modules from both sides, both side walls 1721 and 1722 (and associated mounting rails) are optionally configured to have one or more openings to form the interconnected air plenum. For any module (e.g., 1730) having no neighbors, both side walls 1731 and 1732 are made of solid body without holes to keep the air flows within the interconnected air plenum until reaching the exit region 1709. The advantage of flexibly configuring the side wall is to enhance the volume of the interconnected air plenum to collect more air flows under the backside regions of the assembled thermal solar system so that the thermal energy converted from solar energy can be utilized with higher efficiency.

Figure 17A:
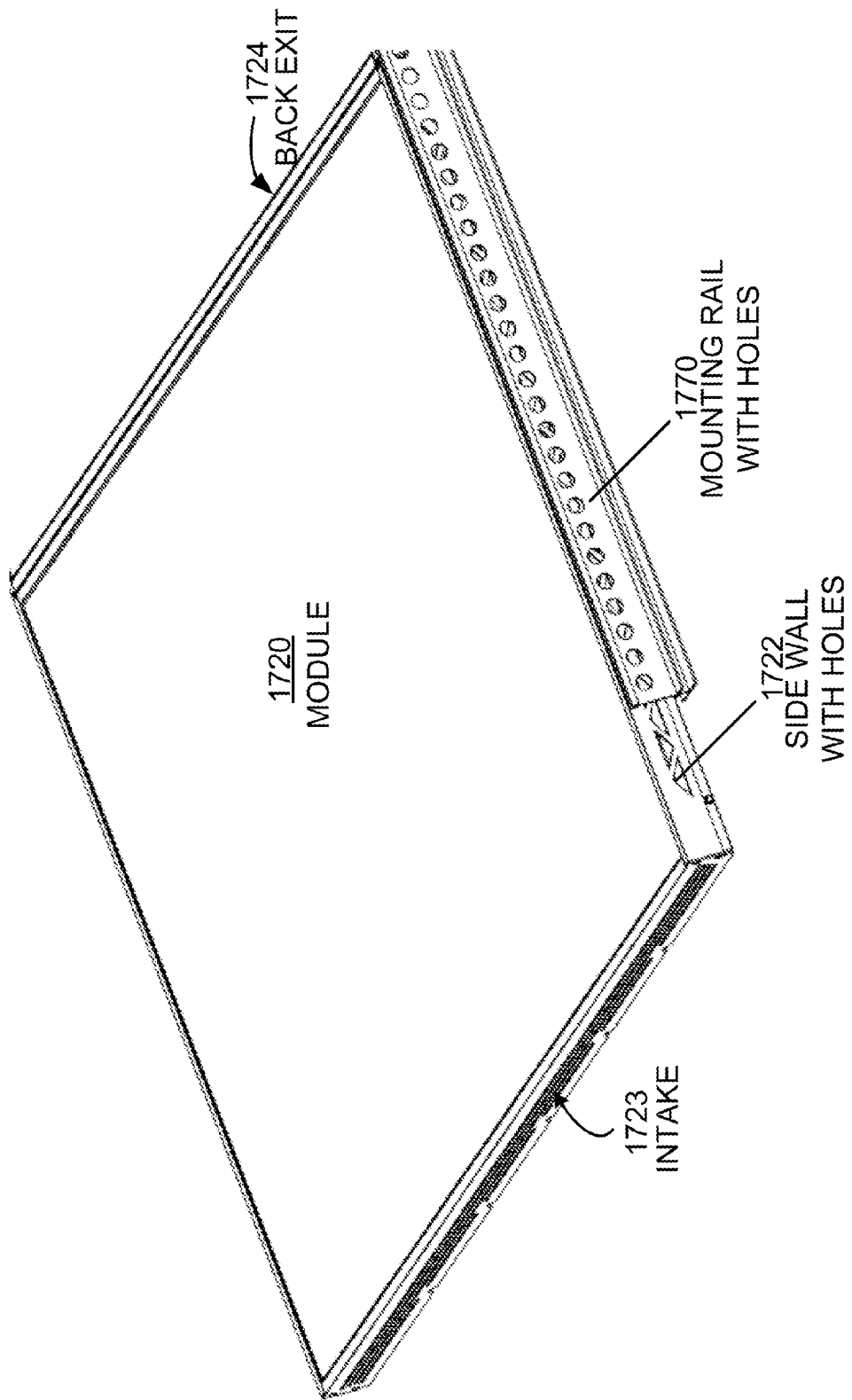
FIG. 17A is a simplified diagram of an integrated solar module with open holes in frame members according to an embodiment of the present invention.

FIG. 17A is an exemplary diagram of an integrated solar module with open holes in frame members according to an embodiment of the present invention. This diagram is merely an example, which should not unduly limit the scope of the claims herein. One of ordinary skill in the art would recognize other variations, modifications, and alternatives. It is a specific example of an integrated solar module 1720 (or 1710) in FIG. 17 having at least one side wall with openings or holes for coupling a neighboring module to form an interconnected air plenum. It is also shown that the integrated solar module 1720 is configured to have its side wall 1722 mounted at a rail structure 1770 with a plurality of holes. The openings in the side wall 1722 substantially align with the holes (although not necessary having same shape and size) in the rail structure 1770 so that the air plenums across the rail structure is interconnected for the air flows to pass through. The rail structure 1770 can be mounted on a roof structure of a building and used for assembling modules one after another in a side-to-side direction. Additionally in an embodiment, the integrated solar module 1720 has a front end plate 1723 connected the two side walls. The front end plate 1723 includes a plurality of small holes and serves an intake region for the air plenum associated with this module. The size of these small holes is selected to allow sufficient opening for the incoming air flows while small enough to prevent bigger objects from entering the air plenum when these modules are deployed on a building roof. In another embodiment, the module 1720 has a back end plate 1724 configured to have coupling elements for easy connection of this module with a front end plate of another module when assembled in the end-to-end direction along the rail structure.

Figure 17B:
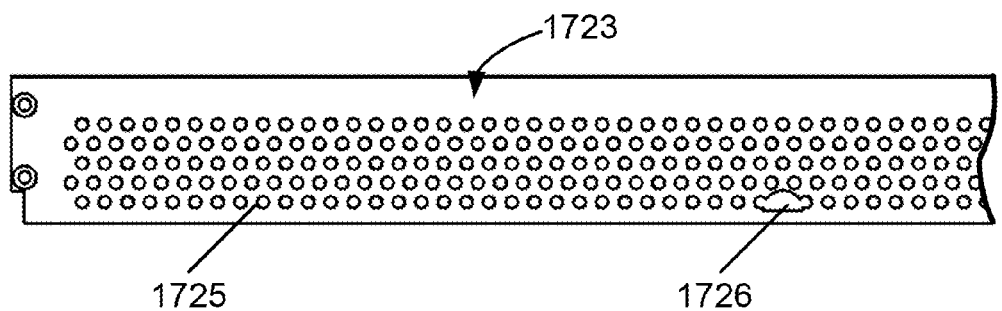
FIG. 17B is a simplified diagram of a front end frame member of the integrated solar module according to an embodiment of the present invention.

FIG. 17B is an exemplary diagram of a front end frame member of the integrated solar module according to an embodiment of the present invention. This diagram is merely an example, which should not unduly limit the scope of the claims herein. FIG. 17B shows the front end plate 1723 of the integrated solar module 1720 of FIG. 17A. Only a left portion of the front end plate 1723 is shown for illustrating the plurality of small holes 1725 configured within a substantial area of the front end member 1723. The front end plate 1723, if the module 1720 is disposed at a first row of an integrated thermal solar system, serves as a part of an intake region for the integrated air plenum. The size of the small holes is selected for allowing easy flow for incoming air flows while preventing any un-wanted objects (birds, small animals, leaves) from entering the air plenum for trouble. In a specific embodiment, the front end plate 1723 also includes some slightly bigger holes 1726 positioned to be level with a bottom plate of the air plenum associated with the integrated module 1720 so that they are capable of draining water (due to condensation or rain drops) that leaks into the air plenum. Assuming that this module is disposed to any position but the first row, the front end plate 1723 can be replaced by a plate containing one or more holes with various shapes and sizes bigger than the those holes 1725 or 1726.

Figure 17C:
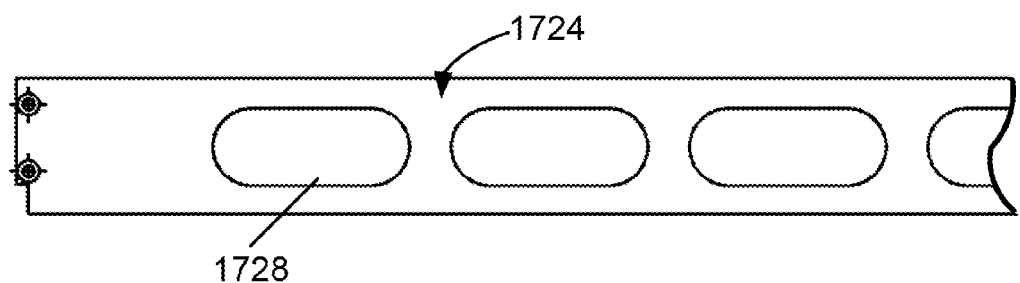
FIG. 17C is a simplified diagram of a back exit frame member of the integrated solar module according to an embodiment of the present invention.

FIG. 17C is an exemplary diagram of a back exit frame member of the integrated solar module according to an embodiment of the present invention. This diagram is merely an example, which should not unduly limit the scope of the claims herein. FIG. 17C shows the back end plate 1724 of the integrated solar module 1720 of FIG. 17A. Only a left portion of the back exit plate 1724 is shown to include several large holes 1728. Assuming that this module 1720 is one disposed at a first row and it is capable of coupling another module in a second row. The holes 1728 are made larger (compared to small holes in the front end member) for reducing resistance for air flowing through the interconnected plenum structure and enhancing thermal transfer between the backside region of solar panels and the air flows. In certain embodiments, the holes 1728 can have many other shapes, sizes, or even be replaced by a single open frame. In another embodiment, the back end plate 1724 can be made of a solid body if the present module 1720 is installed at a last row of any column in the end-to-end direction (e.g., it is a thermal solar module) in an integrated thermal solar system (see FIG. 3 and FIG. 17).

Figure 18:
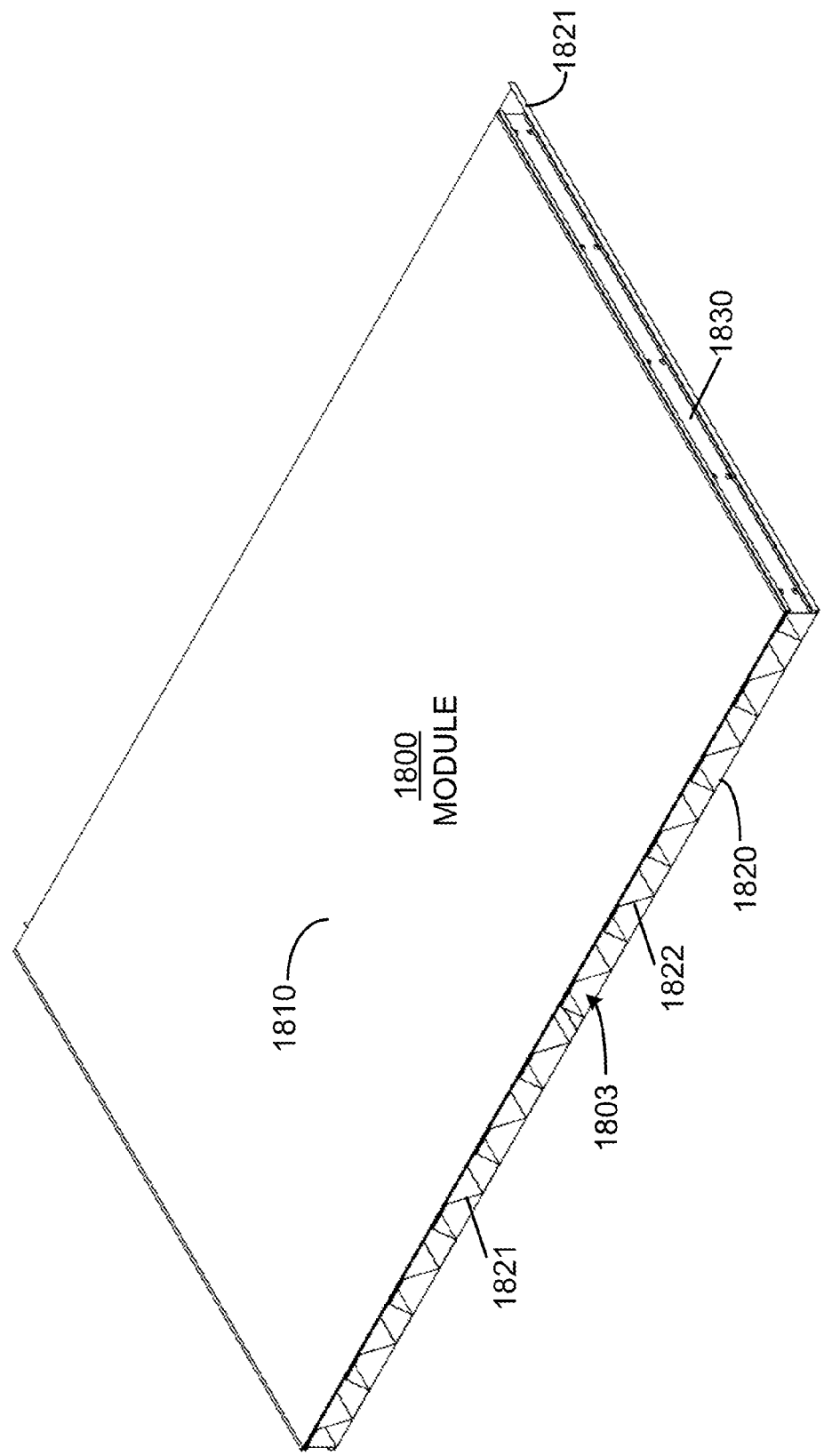
FIG. 18 is an exemplary diagram of an integrated solar module with corrugated pan segments according to an alternative embodiment of the present invention.
Figure 18A:
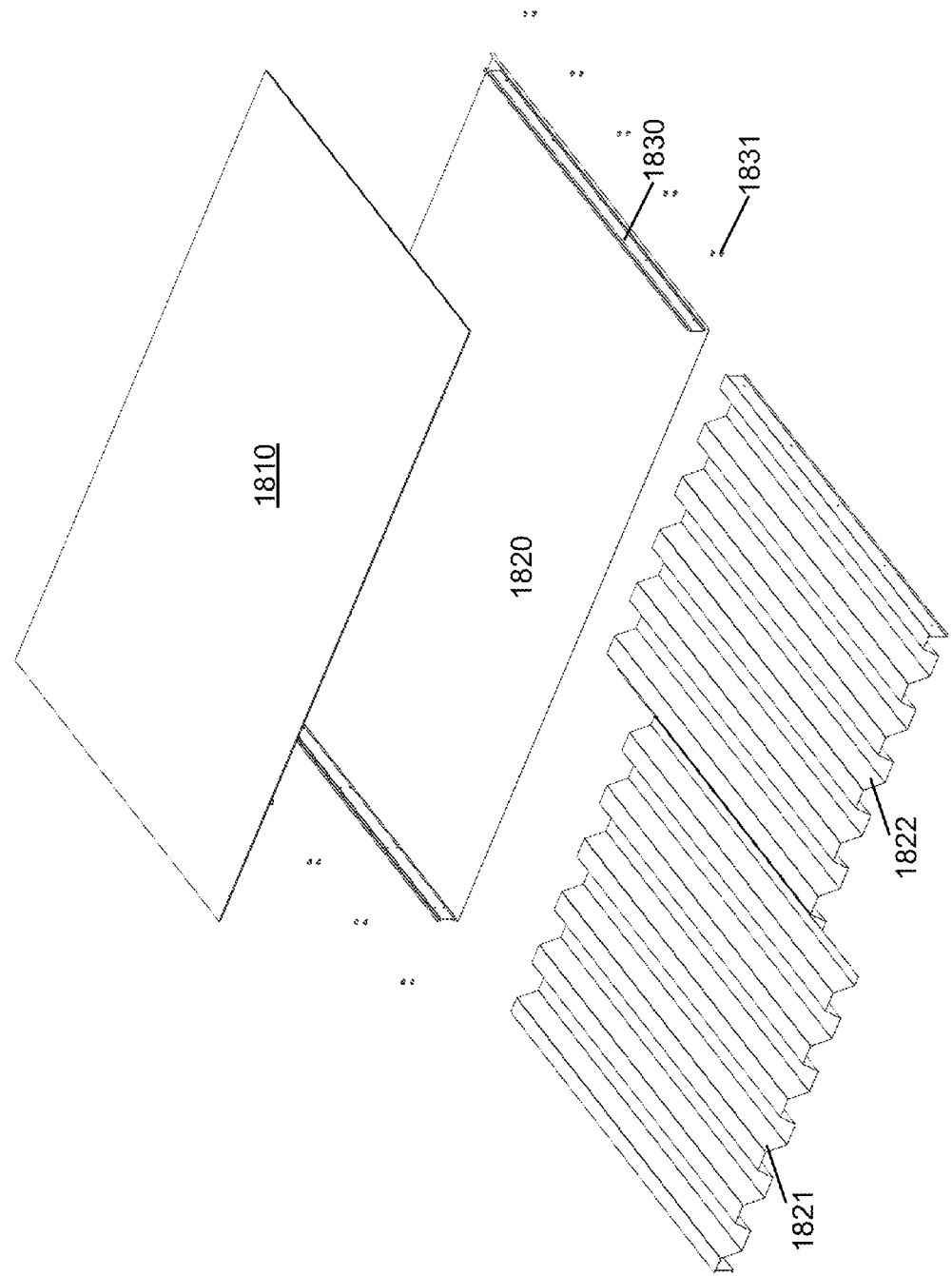
FIG. 18A is an exemplary diagram of a disassembled integrated solar module with corrugated pan segments in FIG. 18 according to the embodiment of the present invention.

In earlier sections of the specification, the plenum structure has been described as a volume of space provided by coupling a shaped thickness of material including side walls coupled with the backside region of the solar module. The shaped thickness of material is made of a rigid sheet material that contains one or more strengthened members to maintain a shape that is defined by the backside region of the solar module. In one or more embodiments, the pan structure has been shown to include one or more pan segments that can be used as an air turbulator for enhancing air flow speed locally inside the plenum structure. FIG. 18 is an exemplary diagram of an integrated solar module with corrugated pan segments according to an alternative embodiment of the present invention. This diagram is merely an example, which should not unduly limit the scope of the claims herein. One of ordinary skill in the art would recognize other variations, modifications, and alternatives. As shown in the perspective view, the integrated solar module 1800 includes a solar panel having its aperture region 1810 exposed on top. The solar panel is coupled with a pan structure (e.g., a bottom plate) 1820 from below via a couple of side walls 1830 to form an air plenum structure. The air plenum has an opened intake region 1803 at the front end and the two side walls 1830. The pan structure 1820 is shown to have an extended portion 1821 near an output region of the air plenum. The extended portion 1821 is configured to couple another integrated solar module of the same kind. In a specific embodiment, the integrated solar module 1800 includes one or more corrugated pan segments 1821 and 1822. Each corrugated pan segment is a molded sheet material having a height substantially equal the gap between a backside region of the solar panel and the bottom plate so that it can be inserted into the air plenum structure and provide thermal contacts between the backside region of the solar module and the bottom plate. The structural elements of the corrugated pan segments is made to be standardized for easy coupling between each other so that multiple corrugated pan segments of the same kind can be interlocked and inserted at the same time to fit the width of the plenum structure. FIG. 18A shows some disassembled members of the integrated solar module with corrugated pan structure shown in FIG. 18. As shown, two pieces of corrugated pan segments are inserted and fixed to the side walls b screws 1831. The channeled portion provides pathways for air flows through the air plenum structure. The advantages of inserting the corrugated pan segment lie in further enhancement of fire retardation to ensure that the integrated solar module has high rating of fire resistance and additional enhancement in adjusting the air flows collected inside the plenum structure to enhance the heat transfer between the backside region of the solar module and the air flows.

FIG. 19 is an exemplary diagram of an integrated solar module with a unibody frame structure and strengthening bars according to an embodiment of the present invention. This diagram is merely an example, which should not unduly limit the scope of the claims herein. One of ordinary skill in the art would recognize other variations, modifications, and alternatives. As shown, the integrated solar module is formed from a solar panel 1910 integrated with a unibody pan structure 1920. The solar panel 1910 has an aperture region exposed and a backside region facing a bottom plate of the pan structure 1920. The pan structure is made from a single piece of sheet material formed to a certain shape, including a front end part 1921 and two side walls 1923. The front end part 1921, as seen, includes a plurality of holes for allowing air to pass through and also some holes near the bottom for draining water. The side wall 1923, as seen, is made as a solid sheet although it can also include multiple through-holes for optionally allowing air to pass through. In another embodiment, the unibody frame structure can be strengthened by adding a bar member 1924 at the back end region to connect the two side walls and one or more bar members 1925 disposed at some middle positions across the bottom plate of the pan structure 1920.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. An integrated solar module capable of being easy assembled for thermal solar application, the module comprising:
   - a solar panel device having an aperture region and a backside region;
   - a shaped thickness of material characterized by a fire rating of at least A and mechanical strength capable of maintaining a thickness free from penetration of moisture and a shape to couple with the backside region, the shaped thickness of material including at least a bottom plate, a first side wall, a second side wall;
   - an air plenum provided between the backside region and the shaped thickness of material, the air plenum having an intake region located from a first end region of the first side wall to a first end region of the second side wall and an output region located from a second end region of the first side wall to a second end region of the second side wall, the intake region being configured to receive airflows from ambient toward the output region, and the airflows optionally being let to pass through either or both of the first side wall and the second side wall, the airflows being driven through the air plenum by an air moving device to pass an exit region at the bottom plate connecting to a fluid drive region for transferring thermal energy generated by the solar panel device;
   - wherein the module is configured to engage with another module in an end-to-end direction and to be attached with a mounting rail to align with another module in a side-to-side direction to form an integrated thermal solar system;
   - wherein the integrated thermal solar system comprises an integrated air plenum having air plenums in the end-to-end direction directly connected one output region to another intake region and air plenums in the side-to-side direction connected one side wall across a mounting rail to another side wall;
   - wherein the mounting rail includes an outer side wall made of a solid plate and an inner side wall having one or more openings allowing the air flows to pass from one air plenum through a mounting rail to a next air plenum of the integrated air plenum;
   - wherein the mounting rail includes one or more openings connecting the one or more openings in the inner side wall.

2. The module of claim 1 wherein the solar panel device is a thermal solar module for converting sun light received by the aperture region primarily to thermal energy.

3. The module of claim 1 wherein the solar panel device is a photovoltaic module for converting sun light received by the aperture region partially to electrical energy and partially to thermal energy carried by the airflows through the air plenum into the fluid drive region.

4. The module of claim 1 wherein the shaped thickness of material comprises a frame structure wrap around the solar panel device assembled from multiple members including at least the bottom plate, the first side wall, and the second side wall.

5. The module of claim 1 wherein the shaped thickness of material comprises a uni-body frame structure made from a single sheet material including the bottom plate, the first side wall, the second side wall, and a front side covering the front end region.

6. The module of claim 5 further comprising one or more bar members disposed across the bottom plate to connect the first side wall to the second side wall at either or both the back end region and one or more middle regions for strengthening the uni-body frame structure.

7. The module of claim 1 wherein the integrated thermal solar system comprises a back end plate made by a solid body.

8. An integrated solar module capable of being easy assembled for thermal solar application, the module comprising:
   - a solar panel device having an aperture region and a backside region;
   - a shaped thickness of material characterized by a fire rating of at least A and mechanical strength capable of maintaining a thickness free from penetration of moisture and a shape to couple with the backside region, the shaped thickness of material including at least a bottom plate, a first side wall, a second side wall;
   - an air plenum provided between the backside region and the shaped thickness of material, the air plenum having an intake region located from a first end region of the first side wall to a first end region of the second side wall and an output region located from a second end region of the first side wall to a second end region of the second side wall, the intake region being configured to receive airflows from ambient toward the output region, and the airflows optionally being let to pass through either or both of the first side wall and the second side wall, the airflows being driven through the air plenum by an air moving device to pass an exit region at the bottom plate connecting to a fluid drive region for transferring thermal energy generated by the solar panel device;
   - wherein the module is configured to engage with another module in an end-to-end direction and to be attached with a mounting rail to align with another module in a side-to-side direction to form an integrated thermal solar system;
   - wherein the integrated thermal solar system comprises an integrated air plenum having air plenums in the end-to-end direction directly connected one output region to another intake region and air plenums in the side-to-side direction connected one side wall across a mounting rail to another side wall;
   - wherein the exit region for the airflows comprises a duct assembly penetrating the bottom plate of the shaped thickness of material plus any underlying material into an inner space region of a building structure where the integrated thermal solar system is installed over.

9. The module of claim 1 wherein the bottom plate comprises a plurality of corrugated pan segments for inducing turbulation to the airflows passing through the integrated air plenum.

* * * * *